United States Patent
Matsueda

(10) Patent No.: US 6,978,867 B2
(45) Date of Patent: Dec. 27, 2005

(54) BICYCLE HUB WITH AN ATTACHED COOLING DISK

(75) Inventor: Keiji Matsueda, Shimonoseki (JP)

(73) Assignee: Shimano, Inc., Sekai (JP)

( * ) Notice: Subject to any disclaimer, the term of this patent is extended or adjusted under 35 U.S.C. 154(b) by 0 days.

(21) Appl. No.: 10/250,146

(22) Filed: Jun. 6, 2003

(65) Prior Publication Data

US 2003/0226722 A1 Dec. 11, 2003

(30) Foreign Application Priority Data

Jun. 11, 2002 (JP) .............................. 2002-170395

(51) Int. Cl.⁷ .............................................. B62L 5/00
(52) U.S. Cl. ................ 188/26; 188/218 R; 188/264 A; 188/18 R
(58) Field of Search ......................... 188/218 R, 24.11, 188/264 A, 264 AA, 26, 17, 18 R

(56) References Cited

U.S. PATENT DOCUMENTS

| 1,580,011 A | * | 4/1926 | Bugatti | .................. | 301/64.203 |
| 1,912,789 A | * | 6/1933 | Norton | .................... | 188/218 A |
| 2,563,769 A | * | 8/1951 | Wyant | .................... | 188/264 R |
| 2,808,909 A | * | 10/1957 | Albert | .................... | 188/264 W |
| 4,621,715 A | * | 11/1986 | Denton | .................... | 188/264 R |
| 5,383,537 A | * | 1/1995 | White | ......................... | 188/78 |
| 5,964,323 A | * | 10/1999 | Henry | .................... | 188/264 R |
| 6,698,557 B2 | * | 3/2004 | Hayes et al. | .......... | 188/264 AA |

FOREIGN PATENT DOCUMENTS

| DE | 100 06 315 A1 | 8/2001 | |
| EP | 688713 A2 | 12/1995 | |
| EP | 834449 A2 | 4/1998 | |
| EP | 1122094 A2 | 8/2001 | |
| FR | 1180752 | 6/1959 | |
| JP | 4-31154 | * 5/1990 | ............. 188/218 R |

* cited by examiner

Primary Examiner—Devon C. Kramer
(74) Attorney, Agent, or Firm—James A. Deland

(57) ABSTRACT

A bicycle hub brake component is provided for braking a hub of a wheel mounted on a bicycle frame The component comprises a brake drum and a cooling disk. The brake drum has a drum body that is adapted to rotate integrally with the hub, wherein the drum body has a brake face on an inner peripheral surface thereof. The cooling disk is crimped and/or caulked to an outer peripheral surface of the brake drum.

31 Claims, 19 Drawing Sheets

Fig. 14
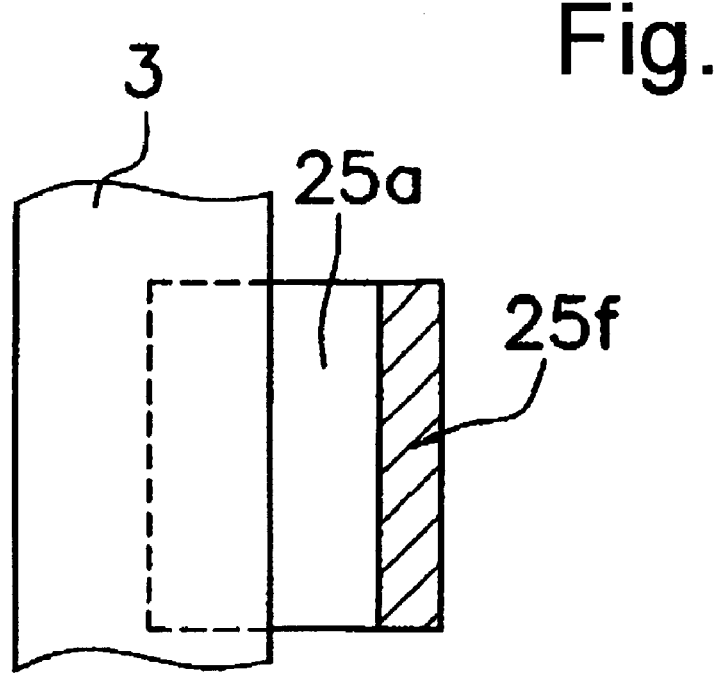
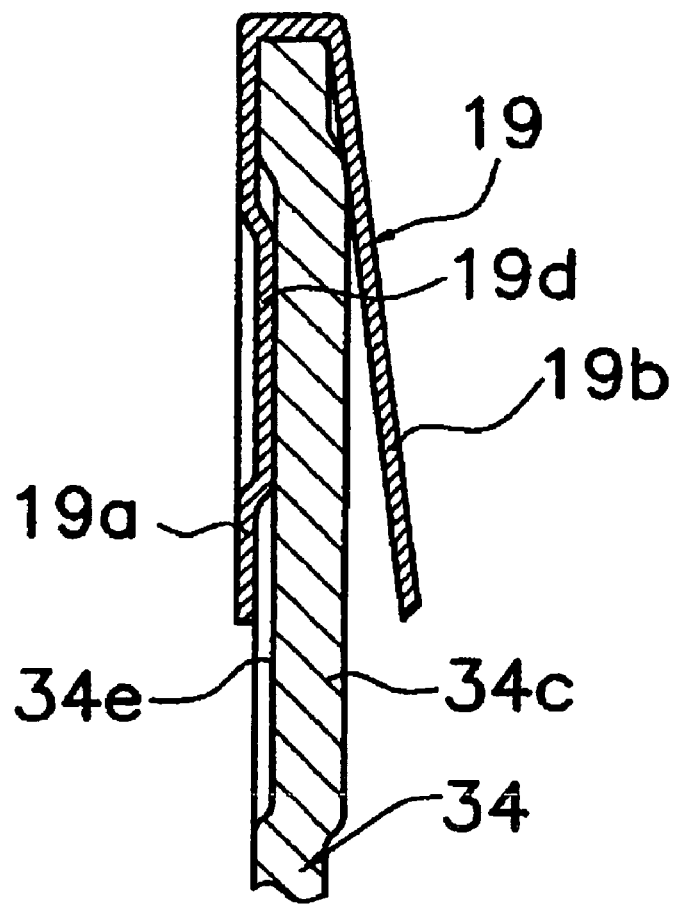

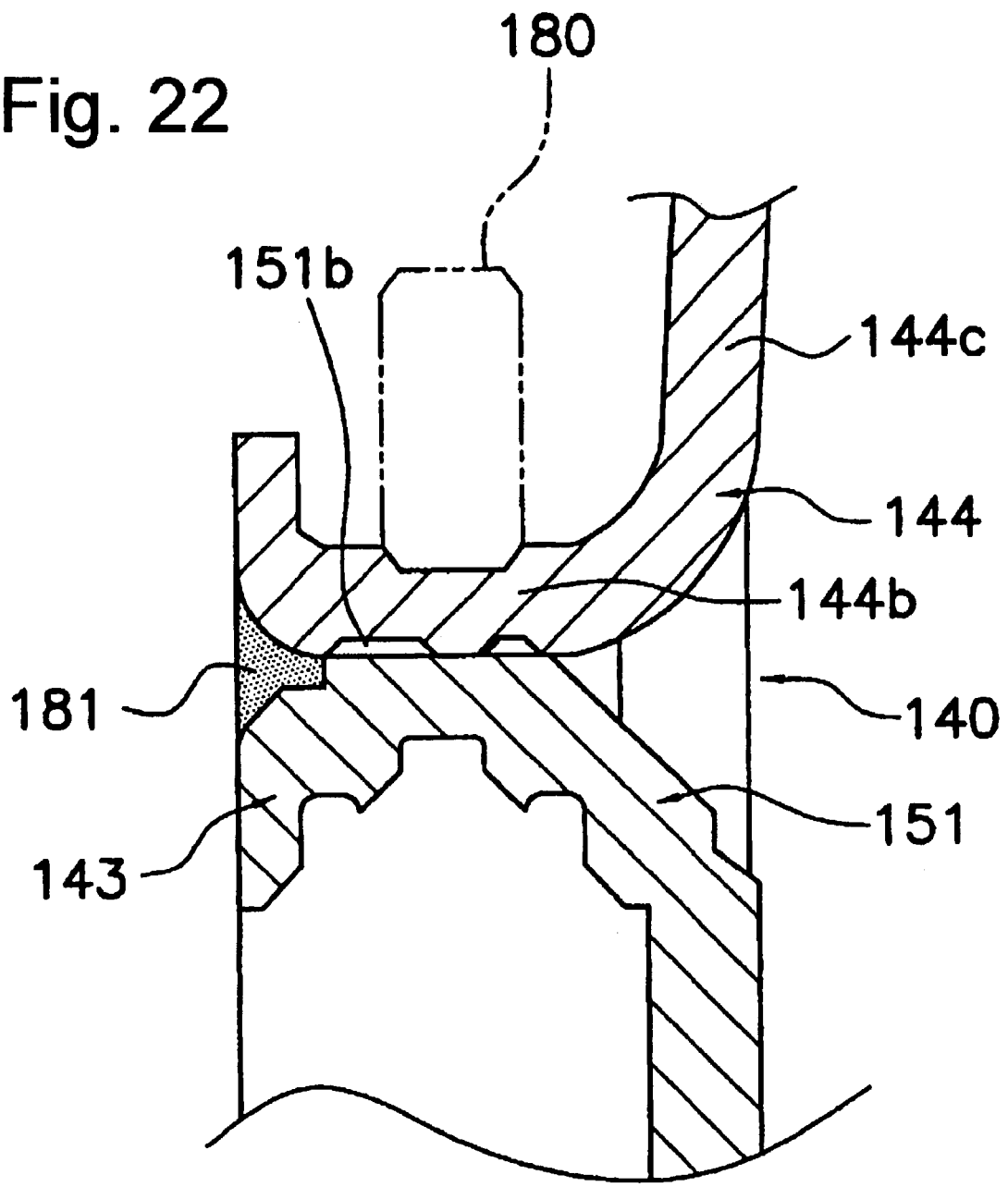

US 6,978,867 B2

BICYCLE HUB WITH AN ATTACHED COOLING DISK

BACKGROUND OF INVENTION

The present invention is directed to bicycle brake devices and, more particularly, to bicycle brake devices that are used to brake a hub of a bicycle wheel.

Bicycle braking devices currently available include rim braking devices and hub braking devices. Rim braking devices include cantilever brakes or caliper brakes that brake the rim of the wheel. Hub braking devices brake the wheel hub, and they include drum brakes, band brakes, roller brakes and the like.

A hub brake brakes the hub of the wheel, so it is able to provide braking even if the wheel rim is warped. Drum brakes and roller brakes, which are hub braking devices of this kind, effect braking by means of friction created when the inside peripheral face of a tubular brake drum that rotates in unison with the wheel hub is contacted by a brake shoe. In a roller brake, rollers spaced apart in the circumferential direction are displaced diametrically outwardly by a cam to move the brake shoe. Grease usually is injected into the interior of a roller brake to ensure smooth displacement of the rollers.

In some brake devices of this kind, a brake drum may be formed from a stainless steel alloy with a brake face on its inner peripheral surface. The brake drum may be provided with a cooling disk having fins that may be fabricated of aluminum alloy. Such a cooling disk has a high heat transfer capability to dissipate the heat generated by contact between the brake shoe and the brake face of the brake drum. As a result, thermally induced deterioration in braking performance can be held in check.

One possible approach to fastening the cooling disk to the brake drum involves inserting the brake drum in a mold and insert molding to form the cooling disk. However, when the cooling disk is fastened to the brake drum by an integral molding process, there is a risk of problems such as discoloration or deformation of the brake drum due to the heat of molding, since the brake drum is fabricated of metal. Parts that have been subjected to metal plating are particularly susceptible to discoloration during insert molding. Discoloration and deformation require manual touchup in a subsequent process, thus resulting in a more complicated production process and higher production costs. Integral molding also requires the transportation of the brake drums to separate locations where casting equipment is located. The brake drums then must be properly positioned in the mold. This creates a laborious and complicated production process as well as the need for complicated and expensive forming molds, thus further increasing production costs.

SUMMARY OF THE INVENTION

The present invention is directed to inventive features of a bicycle braking device. In one embodiment, a bicycle hub brake component is provided for braking a hub of a wheel mounted on a bicycle frame The component comprises a brake drum and a cooling disk. The brake drum has a drum body that is adapted to rotate integrally with the hub, wherein the drum body has a brake face on an inner peripheral surface thereof. The cooling disk is crimped and/or caulked to an outer peripheral surface of the brake drum. Additional inventive features will become apparent from the description below, and such features alone or in combination with the above features may form the basis of further inventions as recited in the claims and their equivalents.

BRIEF DESCRIPTION OF DRAWINGS

FIG. 14 is a side cross sectional view of the insert member and the bracket body prior to mounting the insert member;

FIG. 22 is a cross sectional view of another embodiment of a cooling disk attached to a brake drum.

DETAILED DESCRIPTION

Figure 1:
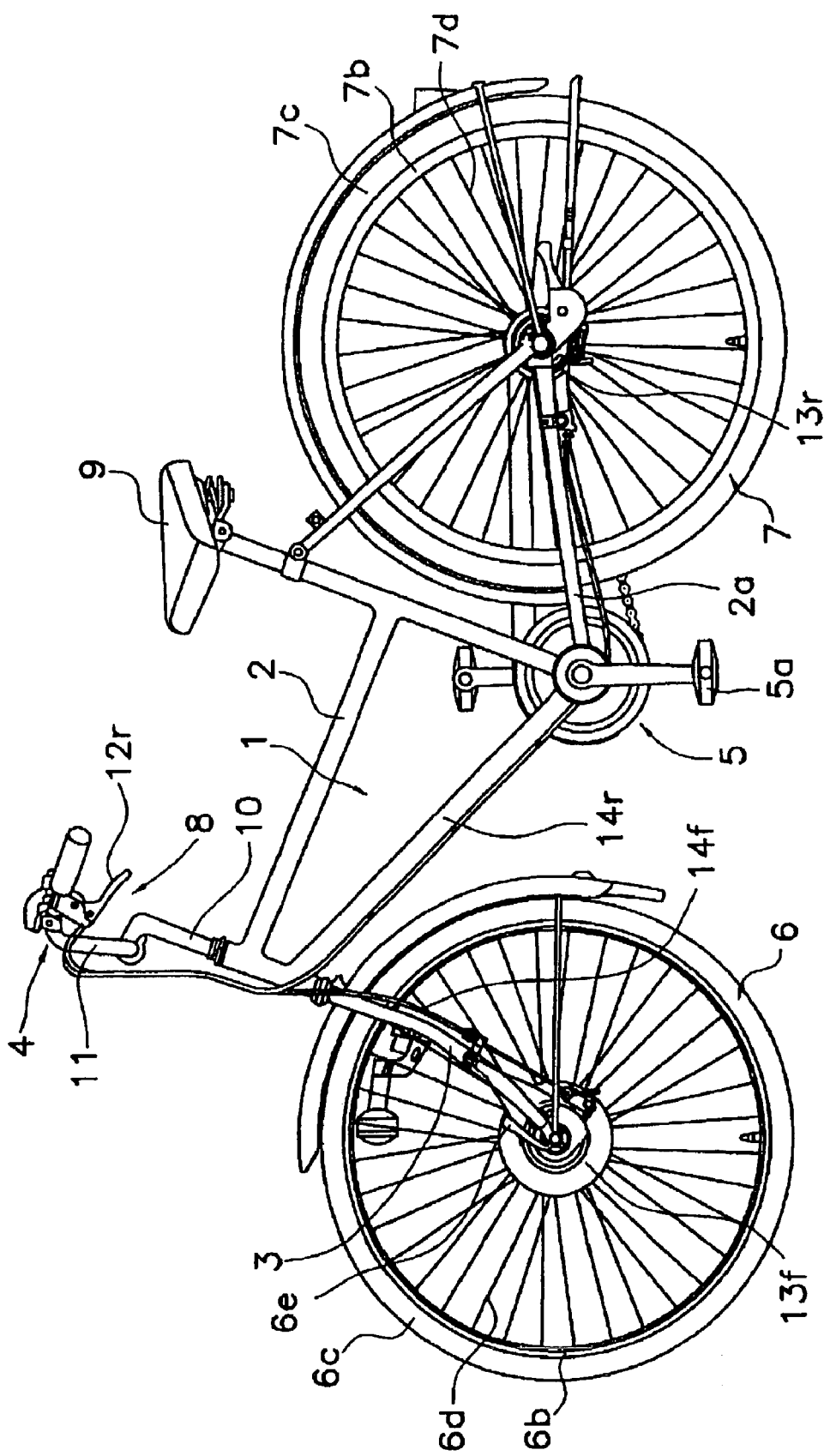
FIG. 1 is a side view of a particular embodiment of a bicycle that includes braking components described herein.

FIG. 1 is a side view of a particular embodiment of a bicycle that includes braking components described herein. In this embodiment, the bicycle comprises a frame 1 that has a frame body 2 and a front fork 3; a handlebar portion 4 comprising a handle stem 10 fastened to the top of front fork 3 and a handlebar 11 fastened to handle stem 10 for steering; a saddle 9 for sitting; a front wheel 6; a rear wheel 7; a brake system 8 for braking front wheel 6 and rear wheel 7; and a drive section 5 for transmitting rotation of pedals 5a to rear wheel 7.

Figure 4:
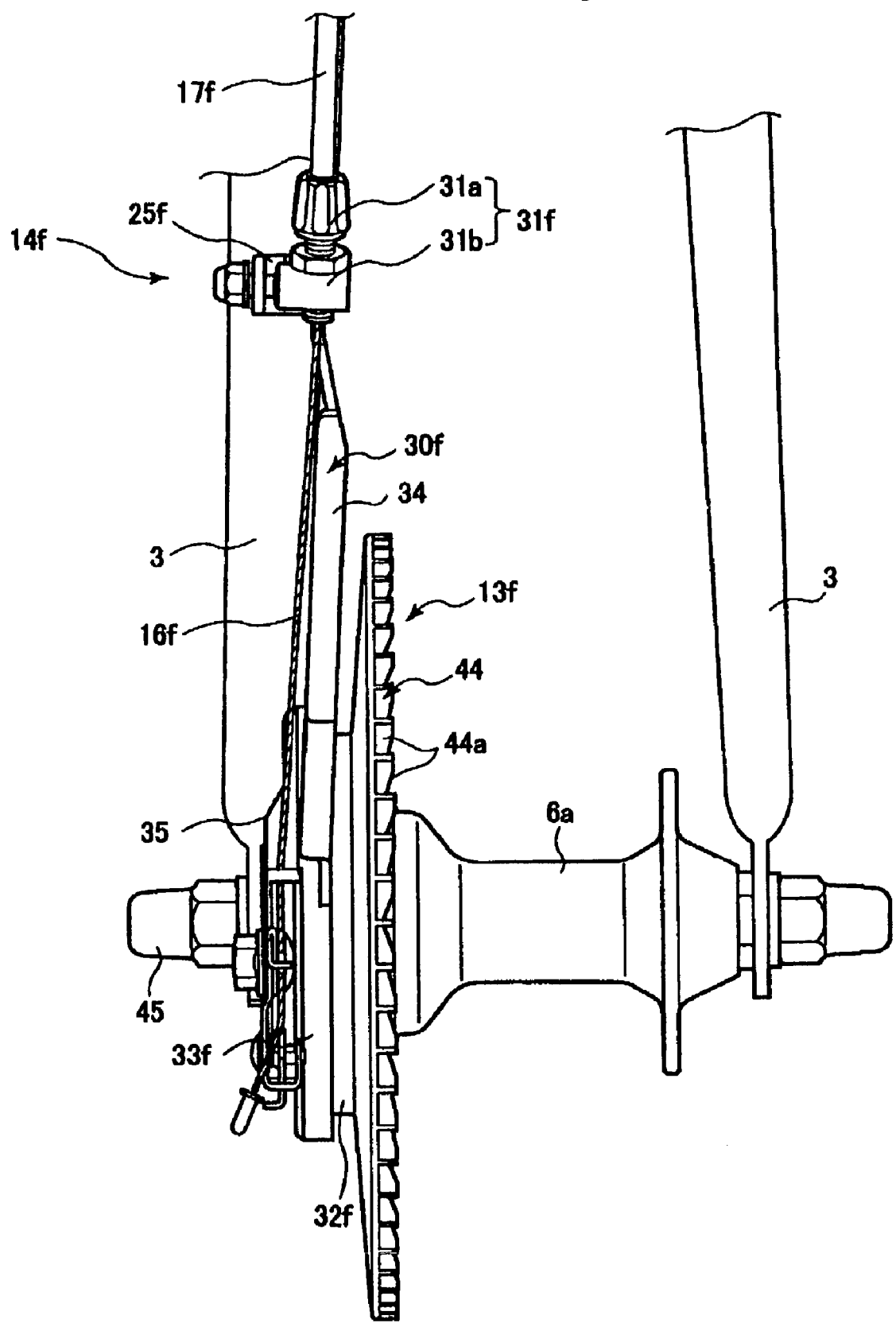
FIG. 4 is a front view of the front brake device.
Figure 6:
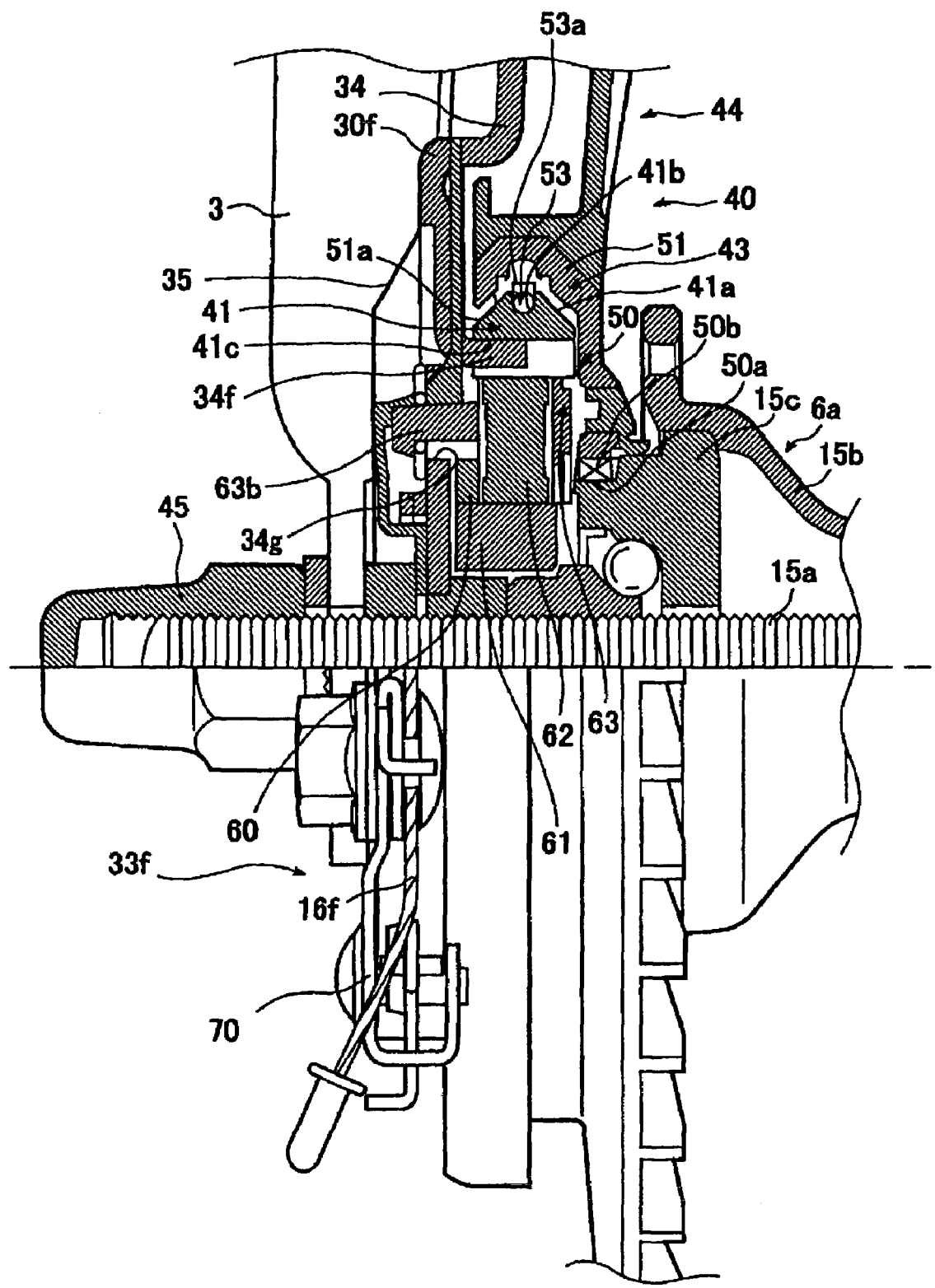
FIG. 6 is an enlarged partial cross-sectional view of the front brake device.

Front wheel 6 and rear wheel 7 have front and rear hubs 6a (FIG. 4, wherein only the front hub 6a is shown), each having a hub spindle 15a (FIG. 6), front and rear rims 6b, 7b (FIG. 1) disposed at the outside periphery of hubs 6b, tires 6c, 7c attached to front and rear rims 6b, 7b, and spokes 6d, 7d connecting the hubs 6a with the respective rims 6b, 7b. As shown in FIG. 6, hub 6a hub spindle 15a is nonrotatably mounted on front fork 3 of frame 1, and a hub shell 15b is rotatably supported on hub spindle 15a. Front hub 6a has a quick release lever 6e (FIG. 1) to provide a quick release hub that is easy to detach. The quick release mechanism is known and described, for example, in the 1993 Japanese Industrial Standard (JIS) Bicycle Edition, p. 276, published by Jitensha Sangyo Shinko Kyokai. Thus, a detailed description of the quick release mechanism will not be provided here. In this embodiment, the hubs6a are fastened to the front fork 3 and chain stay 2a with an ordinary hexagon cap nut 45.

Figure 2:
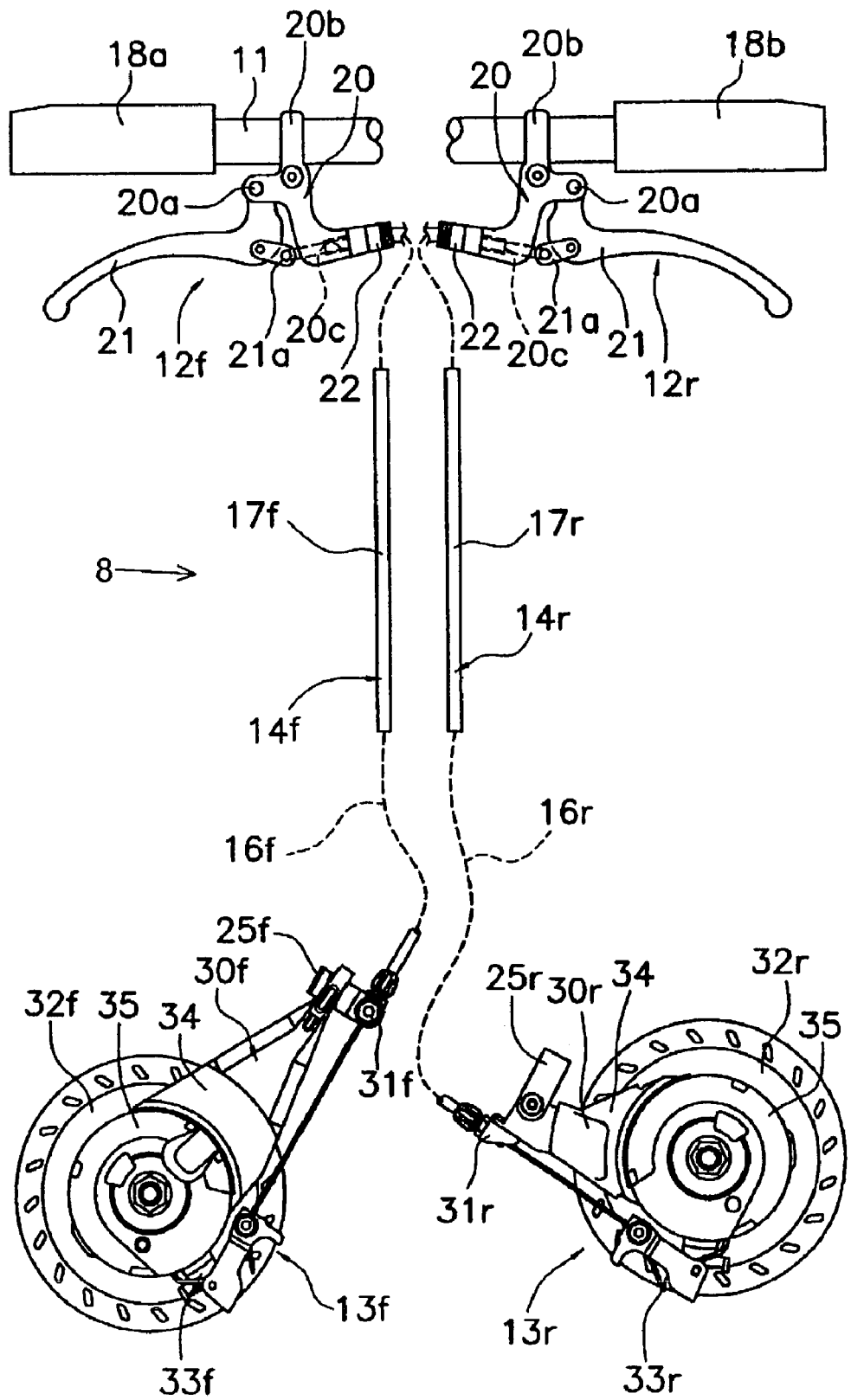
FIG. 2 is a schematic illustration of a particular embodiment of a brake system for the bicycle.

As shown in FIG. 2, brake system 8 has front and rear brake levers 12f, 12r, brake devices 13f, 13r actuated by front and rear brake levers 12f, 12r, and front and rear brake cables 14f, 14r respectively linking the front and rear brake levers 12f, 12r with the front and rear brake devices 13f, 13r. Brake cables 14f, 14r have inner cables 16f, 16r, the two ends of which are linked to front and rear brake levers 12f, 12r and the front and rear brake devices 13f, 13r. Brake cables 14f, 14r also have outer cables 17f, 17r sheathing the inner cables 16f, 16r. The front brake lever 12f is mounted to the inside of a grip 18a mounted on the left end of handlebar 11, and the rear brake lever 12r is mounted to the inside of a grip 18b mounted on the right end of handlebar 11. Brake levers 12f, 12r are identical components disposed in a mirror image relationship. Each brake lever 12f, 12r has a lever bracket 20 mounted on handlebar 11, a lever member 21 pivotably supported on a pivot shaft 20a on lever bracket 20, and an outer detaining portion 22 screwed onto lever bracket 20. Each lever bracket 20 has a mounting portion 20b and a female threaded portion 20c, wherein mounting portion 20b is detachably mountable to handlebar 11, and outer detaining portion 22 is threaded into female threaded portion 20c. Inner cables 16f, 16r passes through their respective outer detaining portions 22 and are detained by corresponding inner detaining portions 21 a mounted to each lever member 21. Lever member 21 is biased towards the brake release position by a biasing member (not shown).

Figure 3:
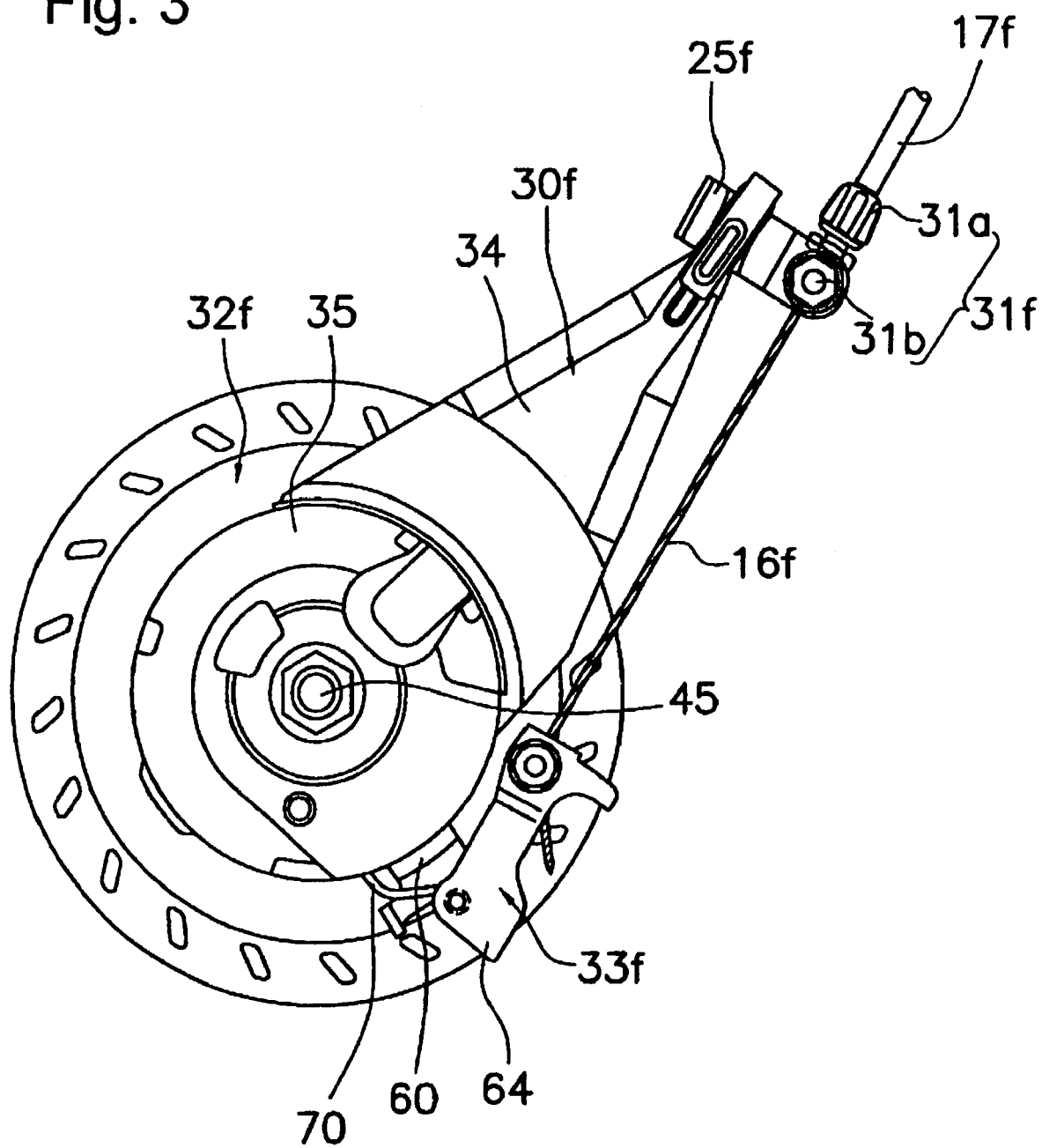
FIG. 3 is a side view of a particular embodiment of a front brake device.
Figure 8:
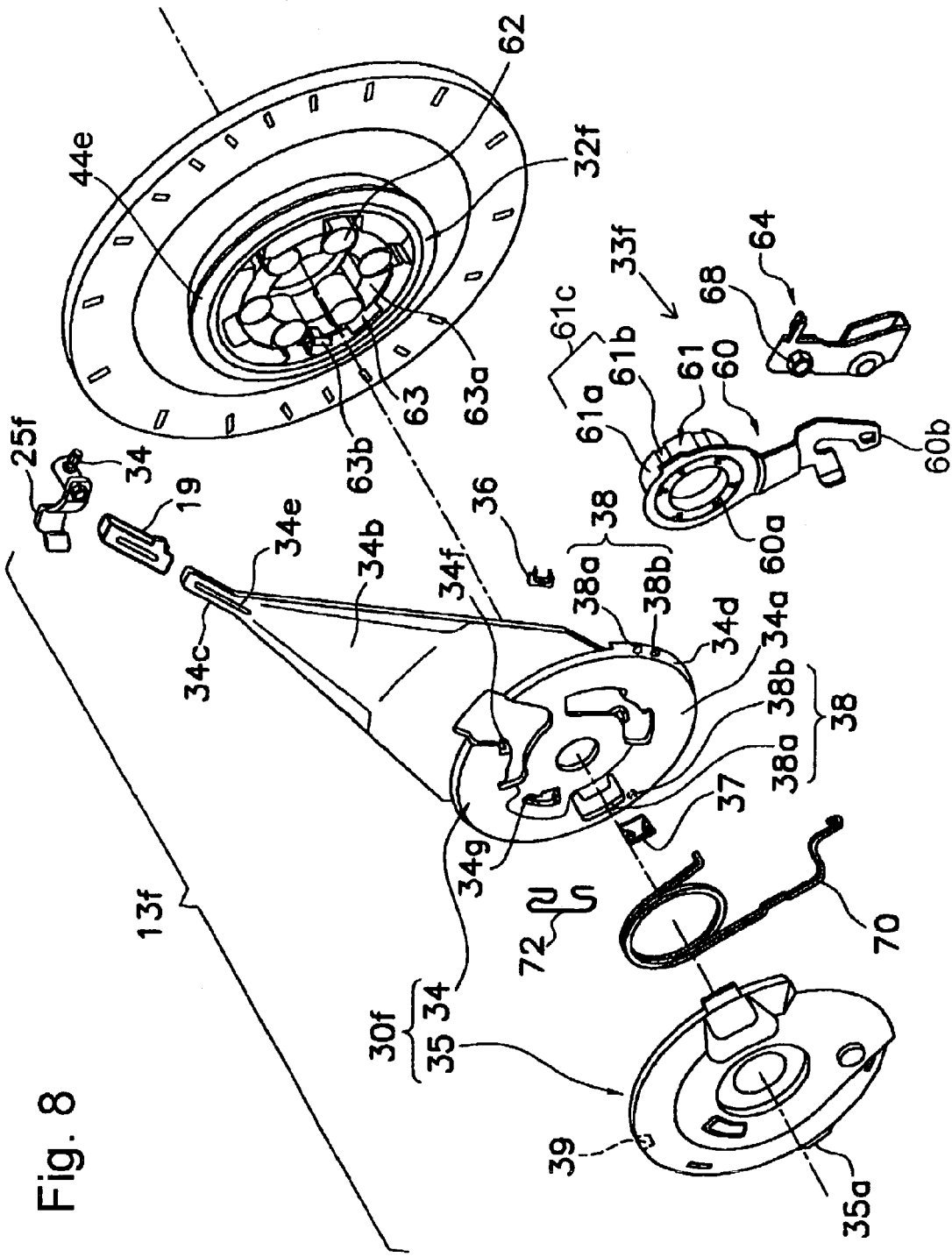
FIG. 8 is an exploded view of a particular embodiment of the bicycle brake device.

In this embodiment, the front and rear brake devices 13f, 13r are roller brake devices. Brake devices 13f, 13r function to brake the hub 6a of front wheel 6 and rear wheel 7, respectively. As shown in FIGS. 2, 3, and 8, brake devices 13f, 13r have fastening brackets 30f, 30r for nonrotatably fastening brake devices 13f, 13r to the front fork 3 or chain stay 2a of the bicycle; brake bodies 32f, 32r; and brake actuating portions 33f, 33r for actuating the brake bodies 32f, 32r. Each fastening bracket 30f, 30r has a bracket body 34 with a first face and a second face produced, for example, by press forming a sheet of steel, and a cover member 35 securely fitting onto bracket body 34 for covering the second face of bracket body 34. Cover member 35 is formed by press forming a thin metal sheet, has a baked-on finish on its surface, and has indicia such as a model number imprinted thereon. Bracket body 34 has a basal portion 34a (FIG. 8) through which hub spindle 15 is passed, a tapering arm portion 34b that extends substantially diametrically from basal portion 34a, and a detaining portion 34c formed at the distal end of arm portion 34b with a substantially equal width plate configuration. As shown in FIG. 6, the basal portion 34a of bracket body 34 is fastened to hub spindle 15a by means of the hexagonal cap nut 45 screwed onto one end of hub spindle 15a. On basal portion 34a, except in the arm portion 34b, is formed a tubular portion 34d of very short length. This tubular portion 34d forms a member mounting portion 38 comprising a pair of mounting holes 38a, 38b for mounting first detaining members 36, 37 that prevent the brake drum 40 from coming off in a manner described below.

As shown in FIGS. 1 and 13–15, the detaining portion 34c of bracket body 34 is fastened to a bracket fastening member 25f, 25r. The detaining portion 34c of the front bracket body 34 is detained detachably, by a one-touch operation, by bracket fastening member 25f in order to facilitate replacement of front wheel 6. On a first face of the front detaining portion 34c (the left face in FIG. 14), there is formed a recess 34e recessed inwardly and extending in the mounting direction. Recess 34e is produced by a press forming process, for example, and projects towards a second face of front detaining portion 34c (the right face in FIG. 14). Bracket fastening member 25f is supplied together with the front brake device 13f by the brake manufacturer, and it is welded to the front fork 3 of the bicycle frame 1. Bracket fastening member 25f has a detaining space 25a for detaining detaining portion 34c when the latter is inserted therein. The two side walls 25b of detaining space 25a are bowed slightly inward so that detaining space 25a has greater width at its mouth (the distance between the side walls 25b at the lower end in FIG. 15) for insertion of detaining portion 34c than it does in its medial portion situated further inward. Since the width at the mouth is greater than the width further inward, detaining portion 34c can be detained regardless of differences in configuration of the front fork 3 of the bicycle.

Figure 15:
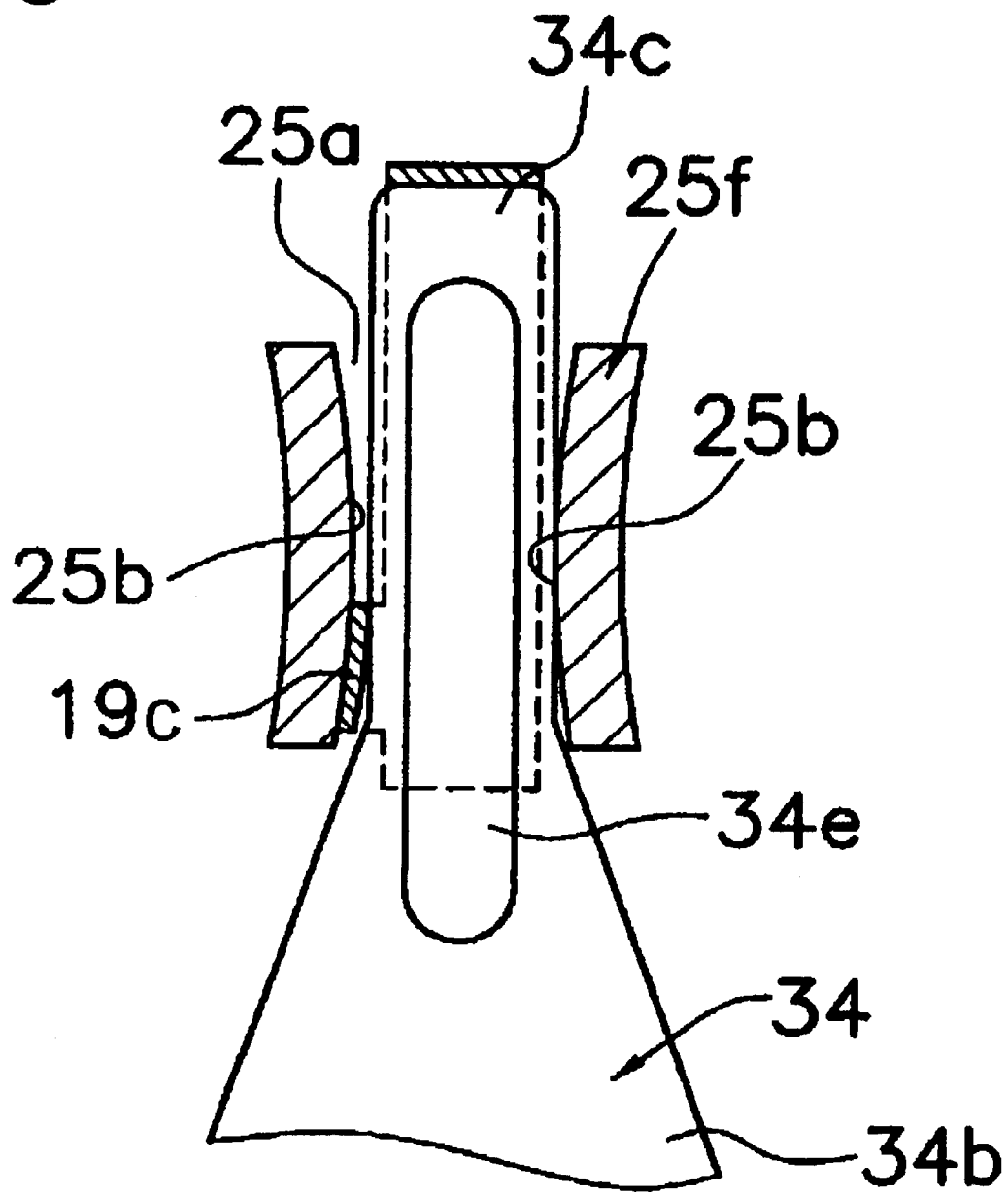
FIG. 15 is a side cross sectional view of the insert member and the bracket body after mounting the insert member.

An insert member 19 produced, for example, by bending a thin sheet of stainless steel for ease of manufacture, durability and corrosion resistance, is mounted on the front detaining portion 34c. Insert member 19 is arranged such that it is situated within detaining space 25a when mounted on detaining portion 34c. Insert member 19 has first and second contact portions 19a, 19b and a third contact portion 19c. First and second contact portions 19a, 19b mount onto the detaining portion 34c from the distal edge thereof, and third contact portion 19c contacts a side of detaining portion 34c due to being bent out from the first contact portion 19a which is juxtaposed to a first face of detaining portion 34c. The first and second contact portions 19a, 19b are bent towards the two faces of detaining portion 34c so that the bent portions are situated at the distal edge thereof. A convex portion 19d is formed on first contact portion 19a for mating with recessed portion 34e of detaining portion 34c. By engaging convex portion 19d within recessed portion 34e, insert member 19 may be mounted at a desired location on detaining portion 34c when insert member 19 is mounted in fastening member 25f. Since the second face of detaining portion 34c projects outwardly (to the right in FIG. 14), the second contact portion 19b of insert member 19 situated at this second face is bent diagonally. It is therefore easier to fill the gap of the detaining space 25a of bracket fastening member 25f for reducing the chatter of the brake device 13f in the axial direction when mounted on the front fork 3. Furthermore, third contact portion 19c is bent diagonally along detaining space 25a as shown in FIG. 15. Accordingly, it is easy to fill in the convex gap of the detaining space 25a of bracket fastening member 25f for reducing chatter in the hub rotation direction.

As shown in FIGS. 2 and 3, bracket fastening members 25f, 25r and fastening brackets 30f, 30r, respectively, have mounted thereon outer mounting portions 31f, 31r for detaining the outer cables 17f, 17r. For example, outer mounting portion 31f may be screwed to the front bracket fastening member 25f. Outer mounting portion 31f has an outer detaining portion 31a and an outer fastening portion 31b. Outer detaining portion 31a is provided for detaining outer cable 17f, and outer fastening portion 31b is provided for fastening outer detaining portion 31a in such a way that the detaining position of outer detaining portion 31a in the cable axis direction is adjustable by means of a screw. Brake play (i.e. the gap between the brake drum and the brake shoe) can be adjusted by adjusting this axial position. Since outer mounting portions 31f are mounted to the frame, there is no need to attach or detach the outer cable when attaching or detaching the wheel.

Since brake bodies 32f, 32r are of substantially identical structure, only the front brake body 32f will be described. As shown in FIG. 6, front brake body 32f has a brake drum 40 and a brake shoe 41. Brake drum 40 has a cylindrical drum body 43 that rotates integrally with the hub shell 15b through a left pocket 15c. Drum body 43 is a stainless steel alloy member having a bowl configuration with a bottom portion 50 and a peripheral portion 51 formed at the outside periphery of bottom portion 50. A contoured (splined) portion 50b is formed on the inside peripheral surface of an opening 50a in bottom portion 50, wherein the splined portion 50b meshes with a complementary splined portion formed on the outer peripheral surface of left pocket 15c. As a result, drum body 43 is nonrotatably mounted relative to hub shell 15b.

Figure 7A:
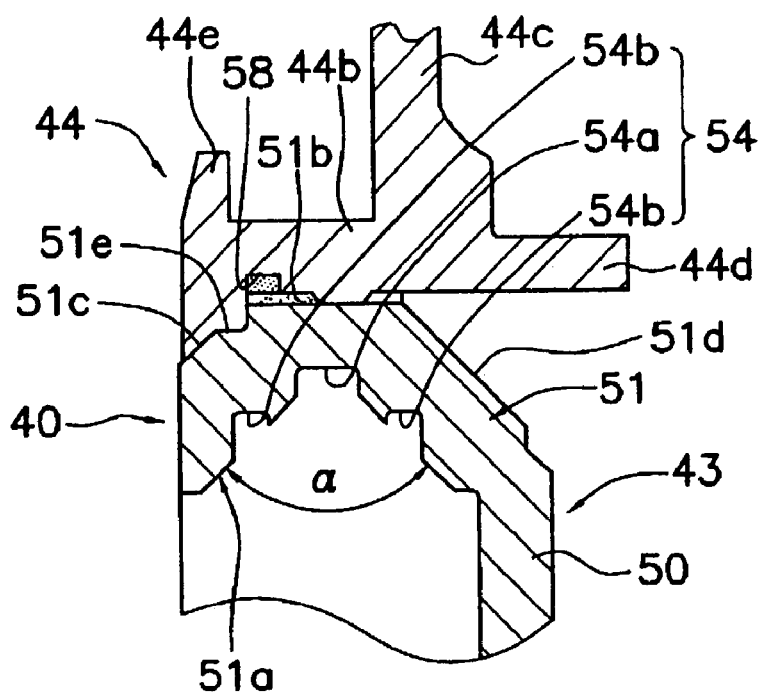
FIG. 7(A) is a partial cross-sectional view of a particular embodiment of a cooling disk press fit to a brake drum.
Figure 7B:
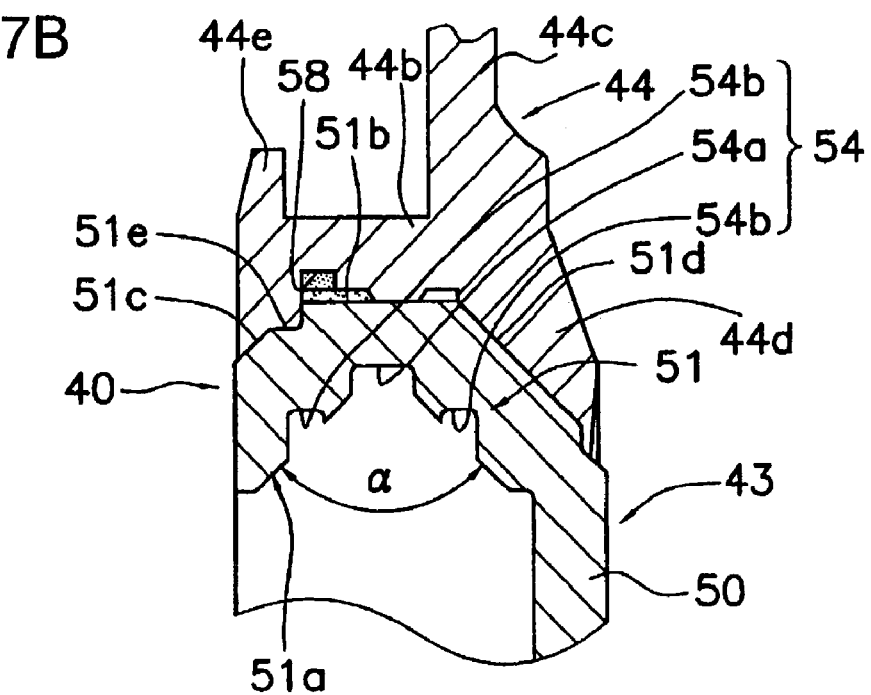
FIG. 7(B) is a partial cross-sectional view of the cooling disk crimped and caulked to the brake drum.

A circular brake face 51a is formed on the inside peripheral face of peripheral portion 51, wherein brake shoe 41 is capable of contacting with and releasing from brake face 51a to provide a braking force to brake drum 40. Brake face 51a is produced by recessing the axial center portion of peripheral portion 51 in an isosceles trapezoidal shape whose cross section constricts in width going outwardly in the diametrical direction. As shown in FIGS. 7(A) and 7(B), the angle $α$ at which the two sides of brake face 51a intersect ranges from 15 °  to 150 ° , preferably 80 °  to 100 ° . Brake face 51a has a diametrically outwardly extending annular grease filled recess 54 packed with grease. Grease filled recess 54 has a first groove 54a, formed in the most deeply recessed portion of brake face 51a so that grease tends to flow into first groove 54a through centrifugal force during riding, and a pair of second grooves 54b situated on brake face 51a at opposite sides of first groove 54a to increase the amount of grease that may be supplied. Grease filled recess 54 is packed with grease at the time of assembly.

A cooling disk 44 made of aluminum alloy is thermally coupled to the outer peripheral surface of drum body 43. Cooling disk 44 has a tubular portion 44b and a disk portion 44c, wherein disk portion 44c extends diametrically outward from tubular portion 44b. A plurality of radially extending cooling fins 44a (FIG. 4) are formed on the inside (right side) face of cooling disk 44 for dissipating heat from hub body 43. Such dissipation is enhanced by the increased surface area as well as the increased contact with air when the wheel is spinning.

As shown in FIGS. 7(A) and 7(B), a knurled portion 51b is formed on the outside peripheral face of peripheral portion 51 by means of a knurling process in order to prevent rotation of cooling disk 44 relative to hub body 43 when cooling disk 44 is mounted to hub body 43. The outer peripheral surface of peripheral portion 51 also has formed thereon a first tapered face 51c and a second tapered face 51d situated on opposite sides of knurled portion 51b, wherein tapered faces 51c, 51d taper downwardly in the diametrical direction. First tapered face 51c is provided for axially detaining the cooling disk 44 to drum body 43, and second tapered face 51d is provided for fastening cooling disk 44 to hub body 43 by crimping and/or caulking. A flat outer peripheral press fitting face 51e is formed between first tapered face 51c and knurled portion 51b. Cooling disk 44 is press fit onto the entire circumference of press fitting face 51e and the knurled portion 51b so that grease packed into the brake drum 40 can be prevented from flowing through the side of hub 6a.

During the fabrication stage, a cylindrical caulk fastening portion 44d is formed on a first end of tubular portion 44b (the right end in FIG. 7(A)). To fasten the cooling disk 44 to the drum body 43 during the assembly stage, the tubular portion 44b is initially press fit onto the outside peripheral face of drum body 43 as shown in FIG. 7(A). A shaving reservoir portion 58 is formed on the inside peripheral surface of tubular portion 44b for holding shavings produced by knurled portion 51b during the press fitting process. Thereafter the caulk fastening portion 44d is bent diametrically inward towards the second tapered face 51d of the drum body 43 as shown in FIG. 7(B) using a roller or some other suitable jig. By press fitting the cooling disk 44 and caulking it onto the drum body 43 in this manner, the cooling disk 44 is securely fastened onto the drum body 43, especially in the axial direction. The larger contact area produced by the tapered faces also improves cooling efficiency. The press fitting/caulking operation does not require application of heat, and it can be performed at the same location. Thus, heat-induced discoloration and deformation is avoided, the labor entailed in the production process is reduced, and the cooling disk 44 is fastened to the drum body 43 in a simple and inexpensive manner.

The other end of the tubular portion 44b of cooling disk 44 (the left end in FIG. 7) has a diametrically outwardly projecting annular convex portion 44e for preventing the brake drum 40 from coming off of the fastening bracket 30 when attaching or detaching the brake device 13f. More specifically, two kinds of first retaining members 36, 37 (FIGS. 8–12) are detachably mounted on member mounting portion 38 of tubular portion 34d of bracket body 34, and a second retaining member 39 is produced by bending cover member 35 diametrically inwardly. First retaining members 36, 37 and second retaining portion 39 are received in the annular groove formed between annular convex portion 44e and disk portion 44c of cooling disk 44

Figure 9:
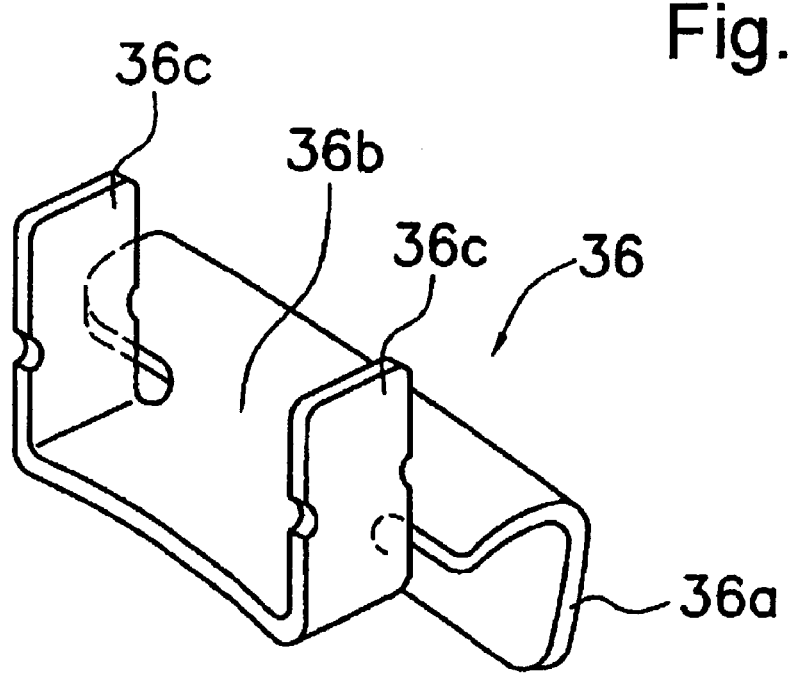
FIG. 9 is a perspective view of a particular embodiment of a retaining member.
Figure 10:
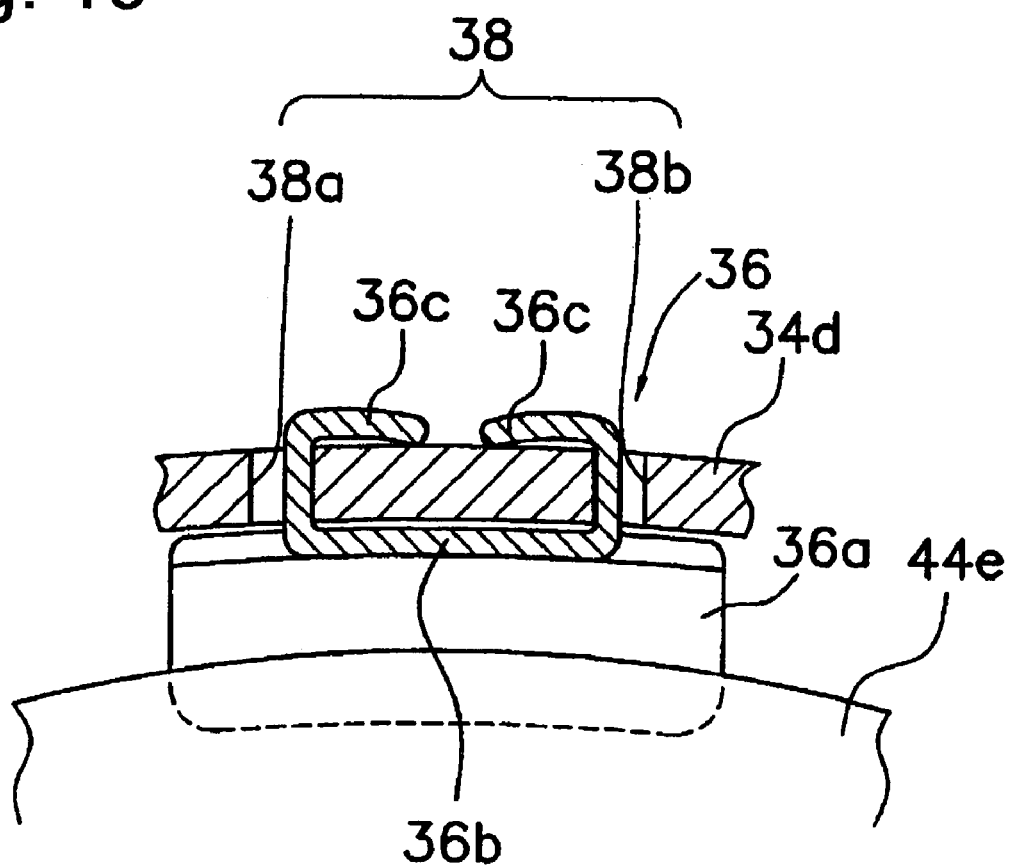
FIG. 10 is a cross sectional view of the retaining member of FIG. 9 in a crimped condition.

As shown in FIGS. 9 and 10, first retaining member 36 is a bent plate member made of stainless steel alloy. First retaining member 36 has a retaining projection 36a that is adapted to be fitted axially inwardly of annular convex portion 44e, a mounting portion 36b produced by bending retaining projection 36a so as to be situated against the inner peripheral face of tubular portion 34d, and bent fastening portions 36c produced by cutting the two ends of mounting portion 36b and bending them in the upward direction as shown in FIG. 9. These bent fastening portions 36c are inserted into mounting holes 38a, 38b from the inner peripheral side of tubular portion 34d, and their distal ends are bent over to mount the first retaining member 36 onto the inside peripheral face of tubular portion 34d as shown in FIG. 10.

Figure 11:
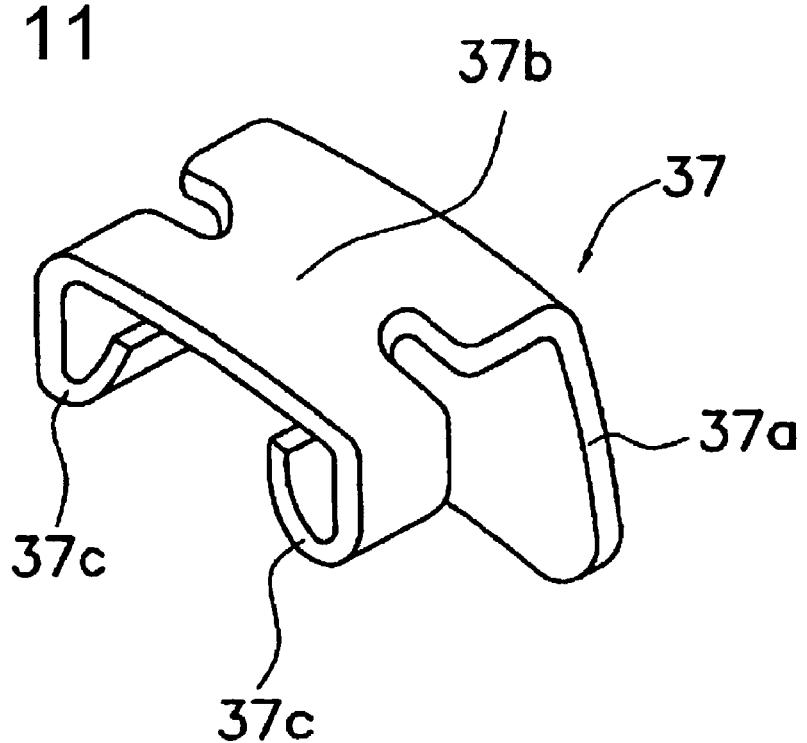
FIG. 11 is a perspective view of another embodiment of a retaining member.
Figure 12:
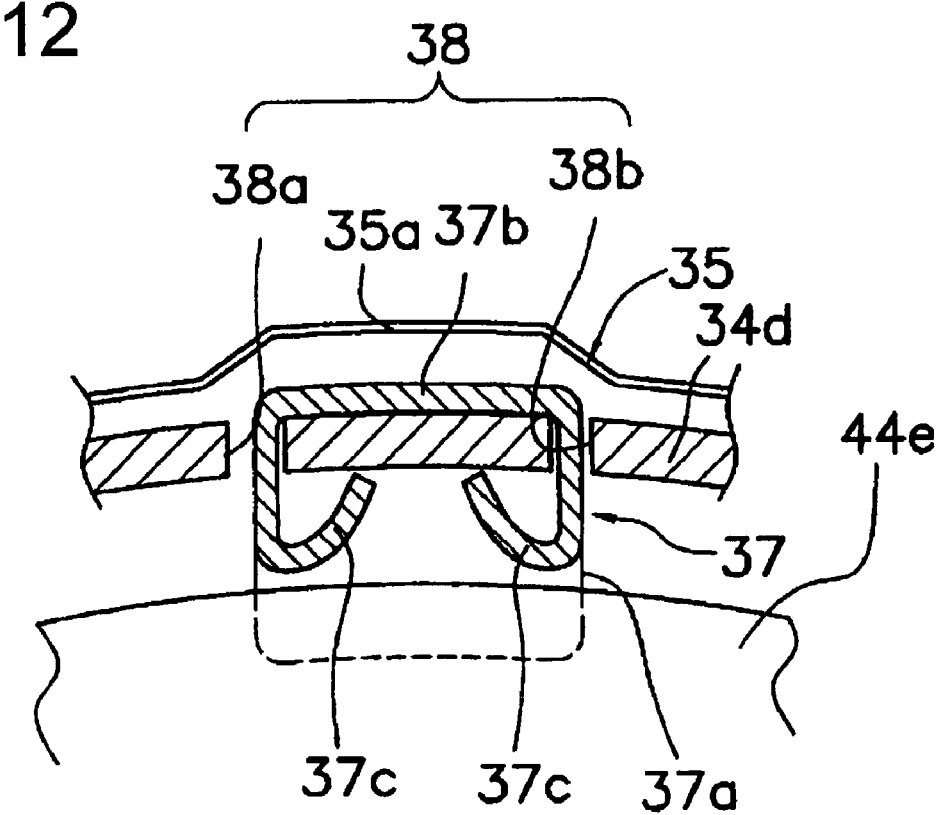
FIG. 12 is a cross sectional view of the retaining member of FIG. 11 in a crimped condition.
Figure 13:
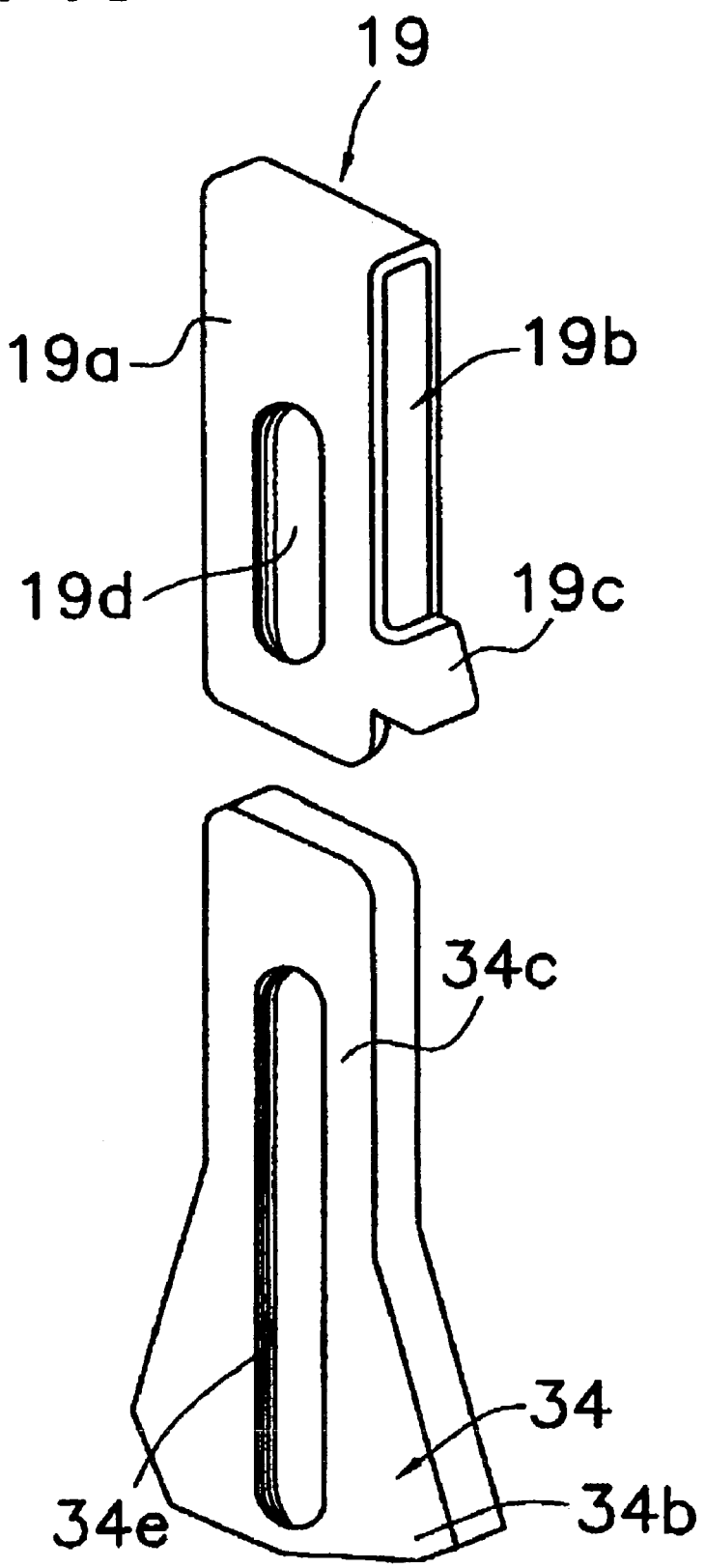
FIG. 13 is a perspective view of particular embodiments of an insert member and a detaining portion of a bracket body.

As shown in FIGS. 11 and 12, first retaining member 37 is a bent plate member made of stainless steel alloy. First retaining member 37 has retaining projection 37a that is adapted to be fitted axially inwardly of annular convex portion 44e of cooling disk 44 a mounting portion 37b produced by bending retaining projection 37a so as to be situated against the outer peripheral face of tubular portion 34d, and elastic fastening portions 37c produced by cutting the two ends of mounting portion 37b and bending them in the downward direction in a U-shape as shown in FIG. 11.

These elastic fastening portions 37c are inserted into mounting holes 38a, 38b from the outside peripheral side of tubular portion 34d. Once elastic fastening portions 37c have passed through mounting holes 38a, 38b, they spread out due to elasticity and are elastically detained on tubular portion 34d, thereby fastening the first retaining member 37 to the outside peripheral face of tubular portion 3. Although the tips of the elastic fastening portions 37c are shown touching the inner peripheral surface of tubular portion 34d, they may instead touch the side walls of mounting holes 38a, 38b. 4d. First retaining member 37 may be removed by prying mounting portion 37b.

As shown in FIG. 8, the second retaining member 39 is formed by bending the cover member 35 inwardly. Second retaining member 39 also is provided for preventing the brake drum 40 from coming off, as well as to detain the cover member 35 on the bracket body 34. Cover member 35 is fastened to tubular portion 34d by means of elastic detention. Providing a second retaining member 39 on cover member 35 allows the number of retaining members 36,37 to be reduced as well as reducing manufacturing costs and the number of steps required to attach the brackete body 34 to brake drum 40. Cover member 35 has a bulging portion 35a formed so as to cover the outside peripheral side of first retaining portion 37, thus making the first retaining member 37 (which is easier to detach than the first retaining member 36 because the first retaining member 36 was fastened to tubular portion 34d by bending) harder to remove.

By preventing the brake drum 40 from coming off by means of first retaining members 36, 37, which are detachable from the tubular portion 34d, and the second retaining member 39 formed on cover member 35, damage to fastening bracket 30f and cover member 35 is prevented when first retaining members 36,37 and second retaining member 39 are attached or detached. The brake drum 40 thus can be retained without breaking fastening bracket 30f or cover member 35, even when brake device 13r is repeatedly disassembled and reassembled.

Figure 16:
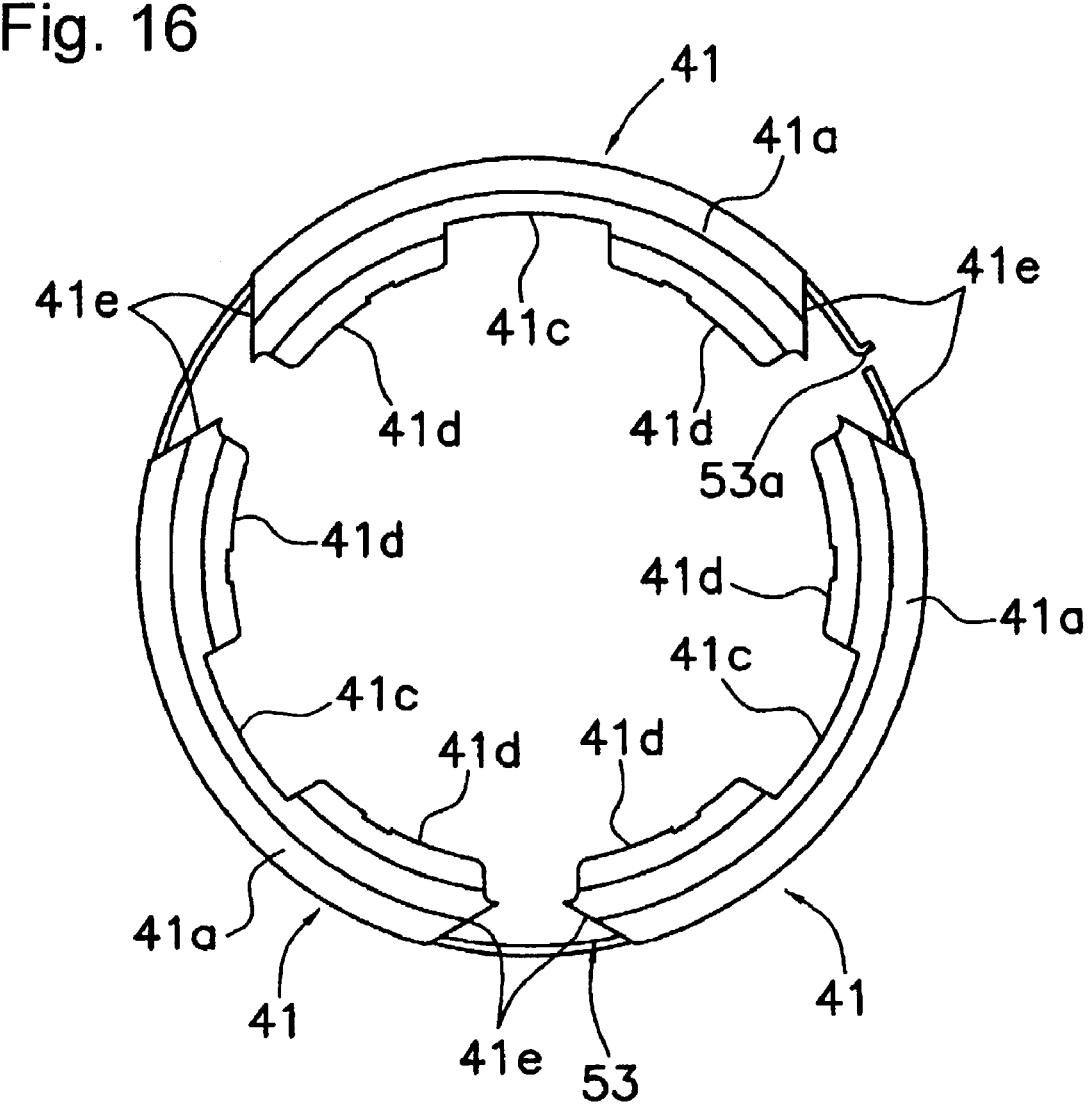
FIG. 16 is a side view of a particular embodiment of a brake shoe assembly.
Figure 17:
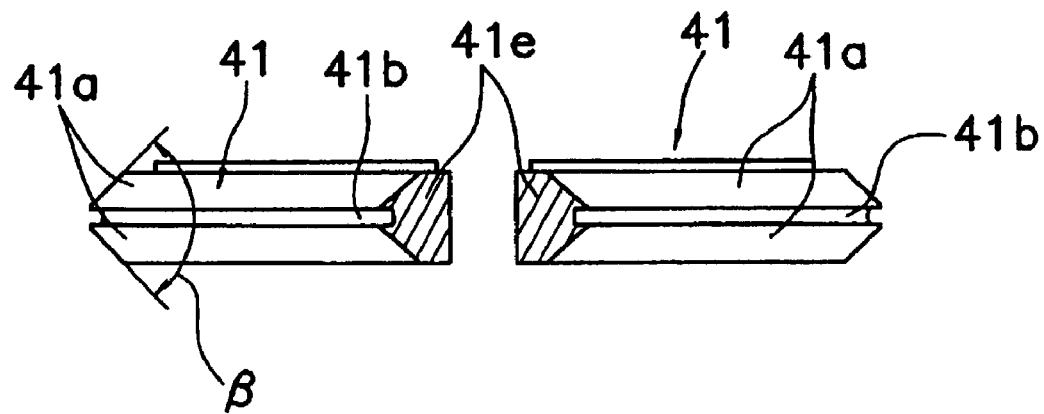
FIG. 17 is a plan view of a portion of the brake shoe assembly.
Figure 18:
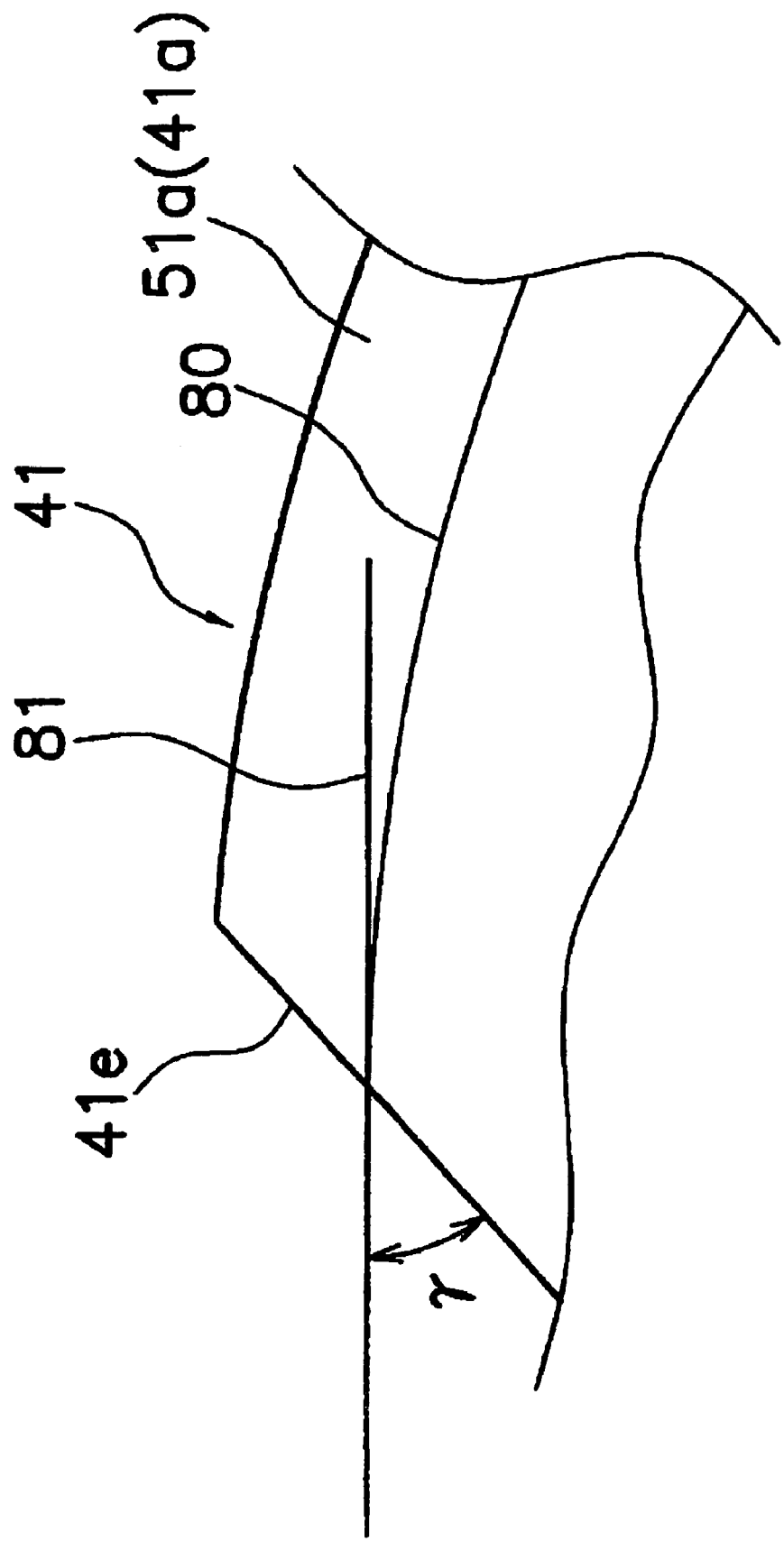
FIG. 18 is an enlarged view of a distal end of a brake shoe.

In this embodiment, as shown in FIGS. 16 and 17, brake shoe 41 consists of a ring-shaped member divided into three segments in the circumferential direction. A contact face 41a is formed on the outer peripheral surface of each segment of brake shoe 41 for contacting the brake face 51a of drum body 43 during braking. Each contact face 41a has a cross sectional shape in the form of an isosceles trapezoid projecting convexly in the radially outward direction so as to contact brake face 51a. The angle $Î^2$ of intersection of the two sides of contact face 41a is equal to or greater than the intersect angle $Î±$ of brake face 51a. As shown in FIG. 18, sloping faces 41e are formed at the two end portions of the contact faces 41a such that an acute angle $Î^3$ is formed with respect to a tangent line 81 at the location of contact of a sloping face 41e with an arbitrary arc 80 on brake face 51a. By providing such sloping faces 41e, grease delivered to the sloping faces during rotation of the brake drum 40 can be supplied smoothly to the brake face 51a. Thus, grease depletion is not likely to occur at the brake face 51a. In the center of contact face 41a is formed an annular housing recess 41b in which a first spring member 53 is mounted. Housing recess 41b is formed so as to be juxtaposed to first groove 54a of grease filled recess 54 in drum body 43.

Three diametrically outwardly recessed rotation stop portions 41c extending a predetermined length in the rotation direction is formed on the inside peripheral surface of brake shoe 41. Three detaining projections 34f (FIGS. 6 and 8) formed on bracket body 34 of fastening bracket 30f fit within these rotation stop portions 41c, thus preventing rotation of the segmented brake shoe 41 relative to bracket body 34. Of course, brake shoe 41 will rotate slightly due to play between detaining projections 34f and rotation stop portions 41c.

The first spring member 53 mounted in housing recess 41b is an annular spring member formed by bending elastic wire material into a circle. Such a configuration makes it easy to bias each segment of brake shoe 41 inwardly towards a position away from the brake drum 40 (i.e., diametrically inward). A first end of the first spring member 53 has a projecting portion 53a that is bent to project diametrically outwardly. In this embodiment, projecting portion 53a projects outwardly approximately 0.4 mm–2.0 mm from the inside peripheral portion. As a result, when brake shoe 41 contacts the brake drum 40 during braking, the distal end of projecting portion 53a tends to be situated within first groove 54a of grease filled recess 54. During brake release, when the brake shoe 41 comes away from the brake drum 40, projecting portion 53a tends to be situated diametrically inward from first groove 54a groove. In this way, during braking (and possibly only during braking), projecting portion 53a can rake out the grease packed into first groove 54a towards the brake face 51a. The size of projecting portion 53a also ends to require no major change in the usual assembly machinery, assembly process, tools, or the like.

Figure 19:
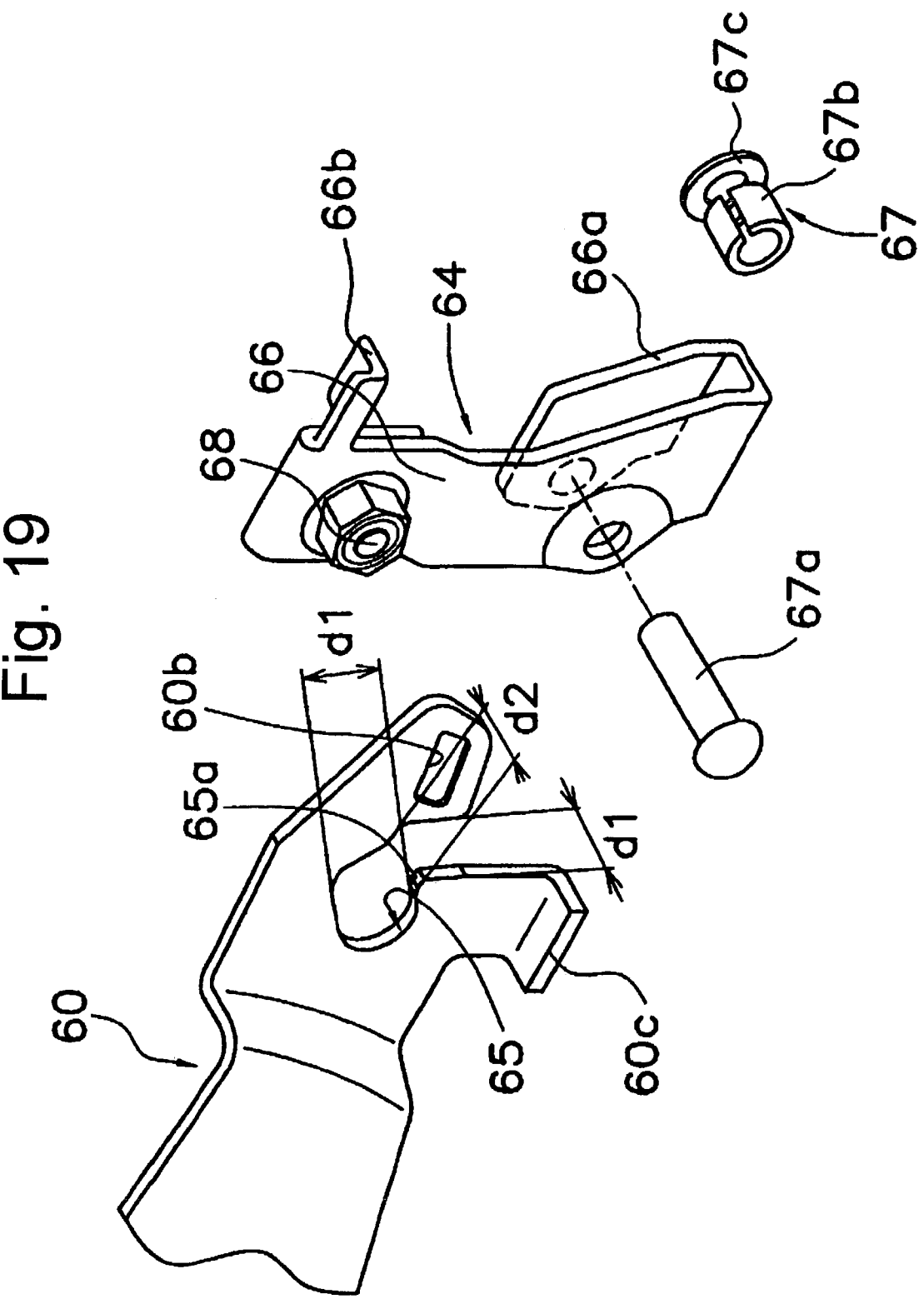
FIG. 19 is an exploded view of a particular embodiment of mounting portions of the actuating arm.

Brake actuating portions 33f, 33r are substantially identical in construction despite their difference in shape, so only the front brake actuating portion 33f will be described here. The front brake actuating portion 33f is rotatably disposed on fastening bracket 30, and it is used to push the segments of brake shoe 41 towards the brake drum 40. As shown in FIGS. 8 and 19, the front brake actuating portion 33f has an actuating arm 60 adapted to be mounted on the bracket body 34 of fastening bracket 30f so that actuating arm 60 rotates round the hub spindle 15a; a cam member 61 that rotates in unison with the actuating arm 60; a plurality of rollers 62 (e.g., six) disposed between and contacting cam member 61 and brake shoe 41; and a roller case 63 for holding the rollers 62 spaced apart from each other in the rotation direction.

Actuating arm 60 is fabricated from a metal plate. An inner mounting portion 64 is detachably mounted to the distal end of actuating arm 60 for detaining the distal end of inner cable 16f of brake cable 14f. Actuating arm 60, which is actuated by means of inner cable 16f via inner mounting portion 64, is linked to the brake lever 12f mounted on the handlebar portion 4 of the bicycle. The basal end of actuating arm 60 is bent and has a mating hole 60a (FIG. 8) for mating with the outside peripheral face of cam portion 61. Actuating arm 60 rotates between a brake released position (shown in FIG. 20) and a braking position (shown in FIG. 21) Actuating arm 60 is biased toward the brake released position by a second spring member 70 in the form of a torsion coil spring. One end of spring member 70 is detained by bracket body 34, and the other end of spring member 70 is detained in a detaining hole 60b formed in the distal end of actuating arm 60. Second spring member 70 is covered by cover member 35.

As shown in FIG. 19, a mounting slot 65 is formed on the distal end of actuating arm 60 for detachably mounting the inner mounting portion 64. Mounting slot 65 proceeds up from the bottom of the distal end of actuating arm 60, bends towards the rotational axis of the actuating arm 60, and then bends diagonally downward. Slot 65 includes a constricted portion 65a that is disposed at the bent portion, wherein constricted portion 65a is narrower in width than other portions. In this embodiment, constricted portion 65a has a width d2 of 5.4 mm, and a back end/front end width d1 of 5.9 mm. An attachment/detachment operation portion 60c used for attaching or detaching inner mounting portion 64 is formed at the bottom of the distal end of actuating arm 60. Attachment/detachment operation portion 60c also facilitates rotation of actuating arm 60, of necessary, when attaching and detaching inner mounting portion 64 from actuating arm 60.

Inner mounting portion 64 has a plate-shaped arm body 66 formed by bending metal sheet material, a retaining portion 67 disposed at the basal end of arm body 66 (the bottom end in FIG. 19), and a cable detaining portion 68 screwed to the distal end of arm body 66. The basal end of arm body 66 is bent into a "U" configuration to form a bracket portion 66a for supporting retaining portion 67. Retaining portion 67 is detachably and rotatably mounted in mounting slot 65 of actuating arm 60, and cable detaining portion 68 is provided for detaining inner cable 16f. An attachment/detachment operation portion 66b that aligns with cable detaining portion 68 is formed at the distal end of arm body 66. Attachment/detachment operation portion 66b extends away from cable detaining portion 68 and then bends sideways. Inner cable 16f thus may be removed as a unit with inner mounting portion 64, and it is not necessary to adjust the brake play every time the wheel is replaced. Also, since inner mounting portion 64 is a large member, it may be easily removed with one hand.

Retaining portion 67 has a flanged retaining shaft 67a fixed to bracket portion 66a, a spring pin 67b mounted on retaining shaft 67a, and a washer 67c disposed such that it contacts spring pin 67b. Spring pin 67b has an axially extending slit formed in its outside periphery, and it may be formed by winding elastic sheet material. Spring pin 67b has an outside diameter greater than constricted portion 65a of mounting slot 65, a width smaller than mounting slot 65 with the exception of constricted portion 65a, and an inside diameter greater than the outside diameter of retaining shaft 67. When spring pin 67b is inserted into the mounting slot 65 to mount the inner mounting portion 64 on actuating arm 60, spring pin 67b inserts smoothly into the entrance of mounting slot 65, is diametrically constricted as it passes through the constricted portion 65a of mounting slot 65, and then expands to its original shape once it has passed through the constricted portion 65a. As a result, it will not return back through the constricted portion 65a during normal operation. However, when holding the two attachment/detachment operation portions 60c, 66b, the retaining portion 67 moves easily out of the mounting slot, and the inner mounting portion 64 can be easily detached from the actuating arm 60.

Figure 20:
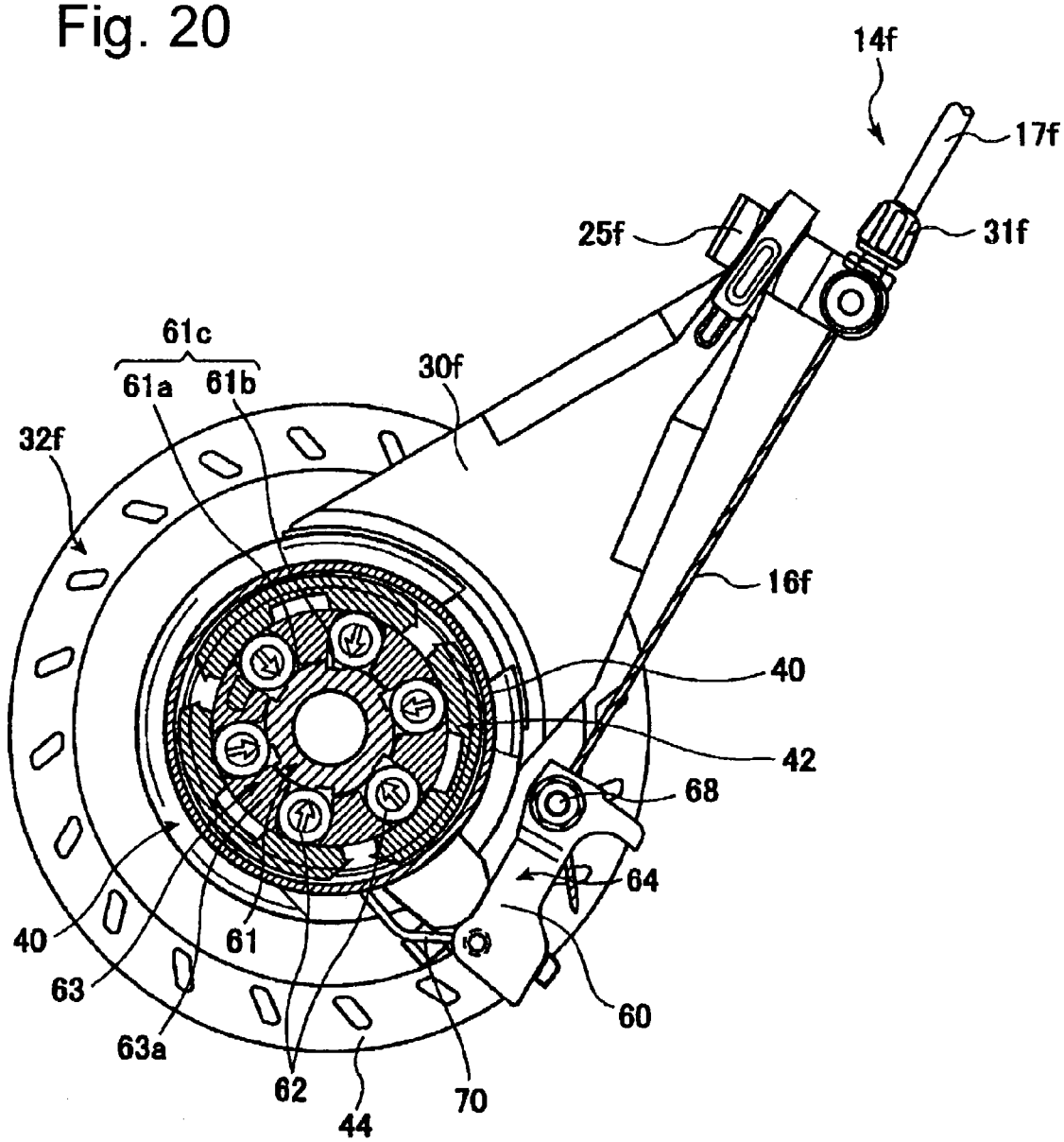
FIG. 20 is a partial cross sectional view of the brake device in a brake released state.
Figure 21:
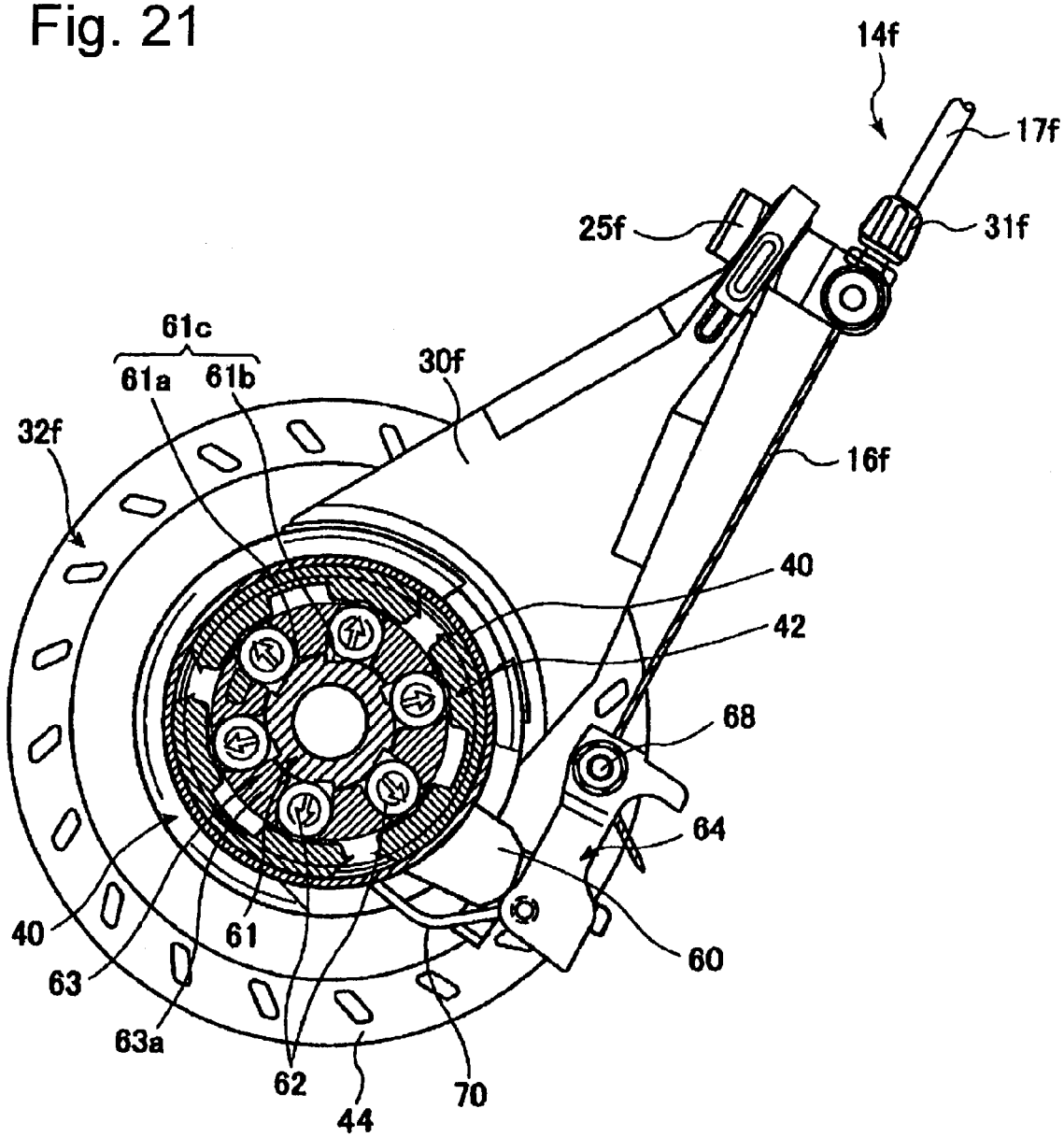
FIG. 21 is a partial cross sectional view of the brake device in a brake activated state.

Cam member 61 is nonrotatably fixed to actuating arm 60 so that it rotates in response to rotation of actuating arm 60. As shown in FIGS. 8, 20 and 21, cam member 61 may be a thick-walled tubular member fabricated of steel. A plurality of cam portions 61c are formed on the outer peripheral face of cam member 61. Each cam portion 61c has a sloping cam face 61a and a recessed portion 61b. In this embodiment, the distance in the diametrical direction of each cam face 61a increases gradually in the clockwise direction in FIG. 20, and the recessed portions 61b are recessed below adjacent pairs of sloping cam faces 61a.

Figure 5:
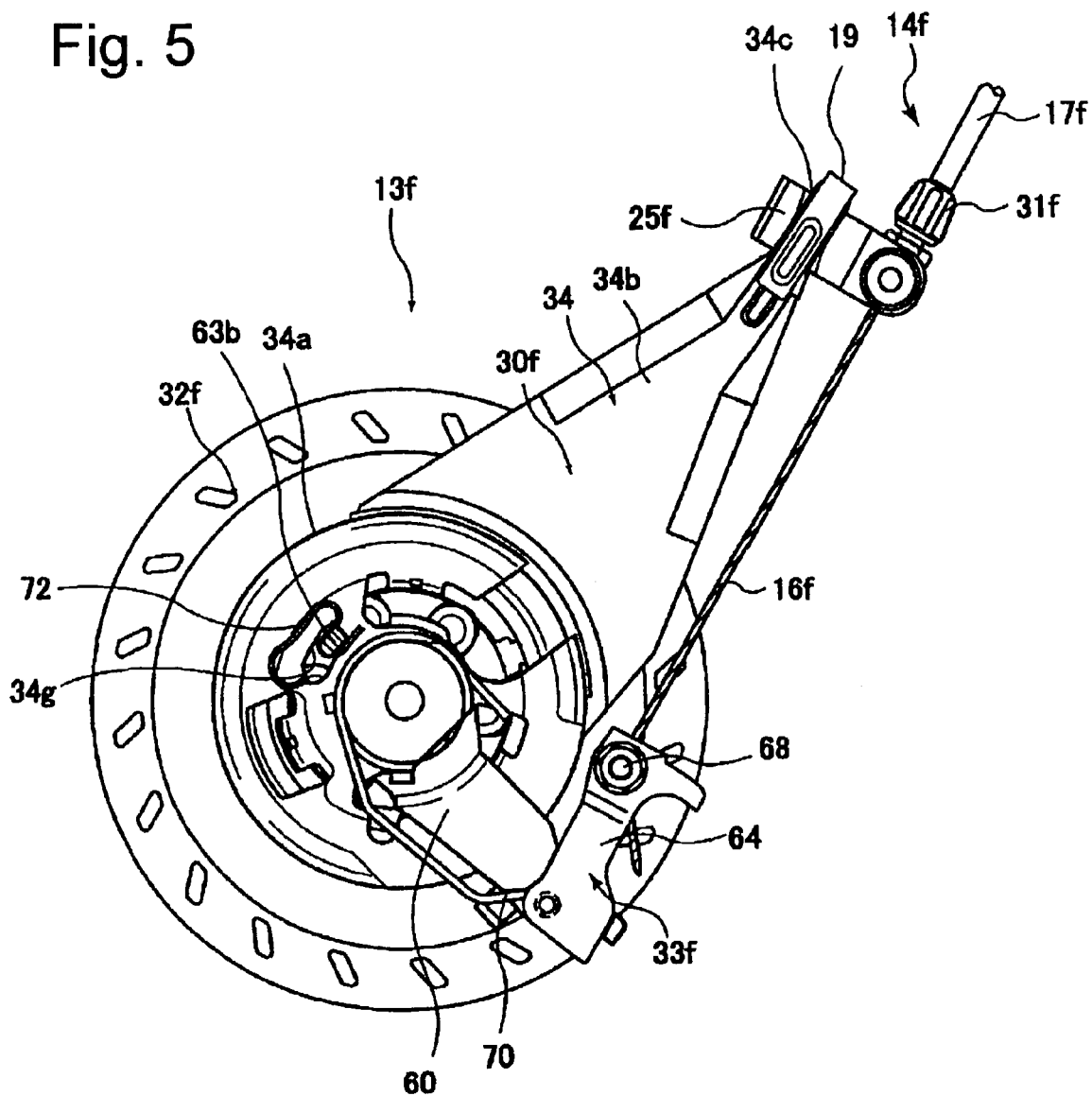
FIG. 5 is a side view of the front brake device with the cover removed.

Roller abutting faces 41d (FIG. 16) that project diametrically inwardly are disposed at the inside peripheral surface at the two ends of each segment of brake shoe 41. Rollers 62 are mounted between the outside peripheral surface of cam member 61 and the roller abutting face 41d of brake shoe 41. Rollers 62 are used to push against brake shoe 41 in response to rotation of cam member 61. Rollers 62 are mounted in a roller case 63 in such a manner that they are spaced apart in a circumferential direction while being capable of movement in a diametrical direction in response to rotation of cam member 61. More specifically, a plurality of retaining projections 63a (e.g., six) are formed in roller case 63. The retaining projections 63a are circumferentially spaced apart and project outwardly in the hub axial direction for retaining the rollers 62. Roller case 63 is nonrotatably detained to bracket body 34 by means of a retaining projection 63b that projects axially further than the other retaining projections 63a. As shown in FIGS. 5, 6, and 8, a slot 34g that is elongated in the rotation direction is formed in bracket body 34 for mating with this retaining projection 63b. A third spring member 72 is mounted between retaining projection 63b and bracket body 34 for biasing the roller case 63 in the clockwise direction in FIG. 20. Thus, the rollers 62 are substantially fixed relative to bracket body 34. Grease is packed within the roller case 63 around the rollers 62 in the same manner as for brake face 51a so that rollers 62 can move smoothly in the diametrical direction in response to rotation of cam member 61. The use of rollers also helps to minimize evaporation of grease and the fluctuation in braking performance due to a rise in brake temperature.

The operation of brake devices 13f, 13r will be described with reference to the front brake device 13f described above. With the brake cables 14f, 14r set up, the inner cables 16f, 16r are under tension, and play between brake shoe 41 and brake drum 40 in the absence of operation of brake levers 12f, 12r may be adjusted by means of the outer detaining portion 22 mounted on brake lever s12f, 12r or the outer mounting portion s31f, 31r mounted on brake device 13f, 13r. In this state, squeezing the front brake lever 12f causes the inner cable 16f to pull in opposition to the biasing force of the second spring member 70, so that the actuating arm 60 rotates from the brake release position shown in FIG. 20 to the braking position shown in FIG. 21.

When actuating arm 60 rotates to the braking position, cam member 61 rotates integrally therewith, and the rollers 62 ride up over the sloped cam faces 61a. As a result, rollers 62 are displaced diametrically outwardly and press the contact faces 41a of brake shoe 41 against the brake face 51a of brake drum 40 in opposition to the biasing force of the first spring member 53. This initially produces a braking force proportional to the pushing force on brake shoe 41. Since brake drum 40 is rotating in the counterclockwise direction of FIG. 21 at this time, brake shoe 41 also turns slightly counterclockwise, and roller case 63 rotates slightly in the same direction via rollers 62. This causes rollers 62 to be displaced further diametrically outwardly and produces an increased braking force. Since the brake face 51a is recessed in a trapezoidal configuration and the contact face 41a projects outwardly in a trapezoidal configuration, the frictional contact force between the friction faces increases through a wedging action. Since the contact area is larger than it would be between flat peripheral surfaces, the frictional force is larger and produces a high braking torque in a unit of compact size. On the other hand, the heat generated per unit of surface area is held to a lower level. Thus, high brake temperature is unlikely to occur, and a fluctuation in braking force due to a rise in brake temperature can be reduced.

When the hand is released from front brake lever 12f, actuating arm 60 returns to the brake released position in accordance with the biasing force of the second spring member 70. Since cam member 61 rotates integrally with actuating arm 60, rollers 62 ride down the sloped cam faces 61a, and the brake shoe 41 moves diametrically inwardly in accordance with the biasing force of the first spring member 53. At this time, the roller case 63 rotates in the clockwise direction in accordance with the biasing force of the third spring member 72, and the braking force stops.

When assembling the brake drum 40, the drum body 43 and cooling disk 44 forms are fabricated by a process such as die casting or forging, and the forms are then finished to the desired dimensions by machining processes. At that time, cooling disk 44 has a shape like that shown in FIG. 7(a), with caulk fastening portion 44d having the form of a cylinder. Cooling disk 44 then is press fit onto the outside peripheral surface of drum body 43. After being press fit, caulk fastening portion 44d is bent diametrically inward towards the caulking face 51d to effect caulking of the cooling disk 44 to the drum body 43 using a roller or the like.

Then, two segments of the brake shoes 41 and the first spring member 53 are assembled and mounted inside the drum body, and the remaining segment of brake shoe 41 is attached so that the first spring member 53 enters the housing recess 41b. The interior may be packed with ample grease at this time. When the mounting of brake shoe 41 is completed, the segments of brake shoe 41 are pushed against brake face 51a, the rollers 62 are mounted in the roller case 63, and both are inserted diametrically inwardly of brake shoe 41. The interior may be further coated with ample grease at this time.

Then, the cam member 61 having the actuating arm 60 fastened thereto is inserted diametrically inwardly of rollers 62. Retaining member 36 is attached to tubular portion 34d of bracket body 34, bracket body 34 is assembled to brake drum 40 so that retaining member 36 engages annular protrusion 44e on brake drum 40, and retaining member 37 is attached to tubular portion 34d of bracket body 34 from the outside to engage annular protrusion 44e. The two kinds of retaining members 36, 37 thus prevent brake drum 40 from coming off. Finally, the third spring member 72 is hooked between bracket body 34 and detaining projection 63b of roller case 63, and the cover member 35 is attached to complete the assembly procedure. The disassembly procedure is the reverse of the above. Thus, fastening bracket 30f and brake drum 40 may be removed as a unit from the frame, and then brake drum 40 may be removed from fastening bracket 30f by removing cover 35, prying retaining member 37 from tubular portion 34d of bracket body 34, and tilting bracket body 34 to disengage retaining member 36 from the annular protrusion 44e of brake drum 40.

When assembling the front wheel 6 having the brake device 13f mounted thereon onto the front fork 3, the insert member 19 mounted on the detaining portion 34c of bracket body 34 of brake device 13f is pushed into bracket fastening portion 25f, and the hub spindle 15a of hub 6a is mounted on front fork 3. The hexagonal cap nuts 45 are then installed on both ends of hub spindle 15a and tightened to the appropriate level of torque to complete mounting of the front wheel 6. Once the front wheel 6 has been mounted, the inner mounting portion 64 is mounted on the actuating arm 60 by inserting the spring pin 67b into mounting slot 65

The front wheel 6 may be removed by substantially reversing the above procedure. However, when removing the inner mounting portion 64, the attachment/detachment operation portion 60c is held with one hand, the attachment/detachment portion 66b is held with the other hand, and the retaining portion 67 of the inner mounting portion 64 is withdrawn from the mounting slot 65. At this time, a small amount of force is needed to constrict the diameter of the spring pin 67b as it passes through the constricted portion 65a, but the part removes easily once past the constricted portion. Since the inner mounting portion 64 is not a small part, unlike conventional ones, it is easily grasped and easy to attach and detach.

While the above is a description of various embodiments of inventive features, further modifications may be employed without departing from the spirit and scope of the present invention. For example, a roller brake for braking the wheel hub was described, but the hub brake device is not limited thereto. The inventive features may be applied to a band brake or drum brake for braking the hub. The brake face 51a and contact face 41a in the described embodiment have a trapezoidal configuration, but the brake face 51a and contact face 41 could be flat faces instead. While the insertion member 19 in the described embodiment was formed form a metal sheet, the insertion member may be easily molded from a hard synthetic resin. In the above embodiment, a cooling disc was provided with an annular protrusion formed thereon, but the outer peripheral surface of the drum main unit could have the annular protrusion if no cooling disc is provided. Also, while the retaining members 36,37 were bent and fixed or based on elastic engagement, the method for fixing the first detents is not limited to these options. An alternative method such as screwing can also could be used. A second detent was provided on the cover member 35 in the described embodiment, but the second detent may also be provided on the bracket main unit 34.

The method for crimping and/or caulking the cooling disk 44 is not limited to that described in the preceding embodiment. For example, as shown in FIG. 22, a knurled portion 151b formed on the outer peripheral surface of a drum body 143 of a brake drum 140 may serve as the caulking face. In this case, caulking is effected by compacting with a roller 180 (shown by the broken line) towards the knurled portion 151b from the outer peripheral surface of tubular portion 144b. This method allows caulking, spin prevention and fastening to be accomplished in a single process. To prevent grease from flowing out, a sealing agent is applied to the gap between the tubular portion 151 of drum body 143 and the tubular portion 144b of cooling disk 144 to produce a sealed portion 181. In this embodiment, the disk portion 144c is not provided with cooling fins.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle hub brake component for braking a hub of a wheel mounted on a bicycle frame, wherein the component comprises:
   a brake drum having a drum body adapted to rotate integrally with the hub, wherein the drum body has a brake face on an inner peripheral surface thereof;
   a cooling disk crimped to an outer peripheral surface of the drum body;

wherein the drum body has a crimping portion to which the cooling disk is crimped;

wherein the crimping portion of the drum body has a crimping face that has a smaller diameter than another face of the drum body for axially retaining the cooling disk in a first direction; and wherein the cooling disk has a free end portion that is bent radially inwardly to extend along the crimping face of the drum body and terminate in close proximity to the crimping face of the drum body so that the bent free end portion overlaps the crimping face of the drum body when viewed along a direction of a rotational axis of the drum body.

2. The component according to claim 1 wherein the cooling disk is press fit to the drum body.

3. The component according to claim 2 wherein the cooling disk is caulked to the drum body.

4. The component according to claim 1 further comprising a brake shoe with a contact face that contacts the brake face to apply a braking force to the brake drum.

5. The component according to claim 4 wherein the brake face has a cross-sectional shape in the form of a recessed trapezoidal configuration that constricts in width diametrically outward, and wherein the contact face has a cross-sectional shape in the form of a convex trapezoidal configuration that constricts in width diametrically outward.

6. The component according to claim 4 further comprising a brake actuating component that presses the brake shoe against the brake face.

7. The component according to claim 6 further comprising a fastening bracket adapted to be nonrotatably mounted to the bicycle frame for supporting the brake actuating component.

8. The component according to claim 7 wherein the brake shoe is substantially nonrotatably mounted relative to the fastening bracket.

9. The component according to claim 8 wherein the brake actuating component is displaceably supported by the fastening bracket.

10. The component according to claim 9 wherein the brake actuating component comprises:
an actuating arm that is rotatable around an axis of the hub;
a cam member that rotates integrally with the actuating arm, wherein the cam member has a contoured outer peripheral surface; and
a plurality of rollers disposed between the outer peripheral surface of the cam member and the brake shoe, wherein the plurality of rollers move diametrically outward in response to rotation of the cam member to move the brake shoe diametrically outward.

11. The component according to claim 1 wherein the drum body has a detaining portion that inhibits axial movement of the cooling disk relative to the drum body.

12. The component according to claim 11 wherein the drum body has a press fitting portion to which the cooling disk is press fit.

13. The component according to claim 12 wherein the detaining portion of the drum body has a detaining face that tapers diametrically inward.

14. The component according to claim 13 wherein the cooling disk has a detaining portion that engages the detaining portion of the drum body.

15. The component according to claim 14 wherein the detaining portion of the cooling disk has a detaining face that tapers diametrically inward for engaging the detaining face of the drum body so that the detaining portion of the cooling disk overlaps the detaining portion of the drum body when viewed along the direction of the rotational axis of the drum body.

16. The component according to claim 15 wherein the crimping face of the drum body tapers diametrically inward.

17. The component according to claim 16 further comprising a knurled portion formed on one of the drum body and the cooling disk for engaging the other one of the drum body and the cooling disk.

18. The component according to claim 1 wherein the cooling disk comprises:
a tubular portion;
a disk portion extending diametrically outward from the tubular portion; and
wherein the cooling disk is crimped to the drum body by bending a first end of the tubular portion diametrically inward toward the crimping face of the drum body.

19. The component according to claim 18 wherein the crimping face of the drum body tapers diametrically inward, and wherein the crimping face of the drum body engages the first end of the tubular portion of the cooling disk.

20. The component according to claim 19 wherein the drum body has a detaining portion on a second end thereof, wherein the detaining portion of the drum body has a detaining face that tapers diametrically inward, and wherein a second end of the tubular portion of the cooling disk has a detaining portion with a detaining face that tapers diametrically inward for engaging the detaining face of the drum body.

21. The component according to claim 20 wherein the drum body has a press fitting portion to which the cooling disk is press fit, wherein the press fitting portion is disposed between the detaining face of the drum body and the crimping face of the drum body.

22. The component according to claim 21 wherein the disk portion of the cooling disk has a plurality of cooling fins spaced apart in a circumferential direction.

23. The component according to claim 1 further comprising a plurality of circumferentially spaced recessed portions formed around an outer peripheral surface thereof the drum body.

24. The component according to claim 23 wherein the cooling disk is crimped to the plurality of circumferentially spaced recessed portions.

25. The component according to claim 1 wherein the drum body has a detaining portion with a detaining face that has a smaller diameter than another face of the drum body to inhibit axial movement of the cooling disk relative to the drum body in a second direction opposite the first direction.

26. The component according to claim 25 wherein the drum body has a press fitting portion to which the cooling disk is press fit.

27. The component according to claim 25 wherein the detaining face of the drum body tapers diametrically inward.

28. The component according to claim 27 wherein the cooling disk has a diametrically inward extending detaining portion that engages the diametrically inward tapered detaining face of the drum body.

29. The component according to claim 28 wherein the detaining portion of the cooling disk has a detaining face that tapers diametrically inward for engaging the diametrically inward tapered detaining face of the drum body.

30. The component according to claim 29 wherein the crimping face of the drum body tapers diametrically inward.

31. The component according to claim 1 wherein the detaining portion of the drum body is laterally opposite the crimping portion of the drum body.

* * * * *